US006633947B1

(12) United States Patent
Holman et al.

(10) Patent No.: US 6,633,947 B1
(45) Date of Patent: Oct. 14, 2003

(54) MEMORY EXPANSION CHANNEL FOR PROPAGATION OF CONTROL AND REQUEST PACKETS

(75) Inventors: Thomas J. Holman, Portland, OR (US); Peter D. MacWilliams, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/154,063

(22) Filed: Sep. 16, 1998

(51) Int. Cl.[7] .......................... G06F 12/00; G06F 3/00; G06F 13/00
(52) U.S. Cl. .......................... 711/5; 711/105; 711/154; 710/2; 710/38; 710/300
(58) Field of Search .................................. 711/105, 157, 711/154, 111, 200, 5, 169; 710/2, 3, 4, 5, 38, 36, 33, 30, 300, 52, 129

(56) References Cited

U.S. PATENT DOCUMENTS

| | | | | |
|---|---|---|---|---|
| 5,319,755 A | * | 6/1994 | Farmwald et al. | 395/325 |
| 5,392,407 A | * | 2/1995 | Heil et al. | 385/325 |
| 5,526,507 A | * | 6/1996 | Hill | 395/441 |
| 5,579,264 A | * | 11/1996 | Glass | 365/189.05 |
| 5,913,046 A | * | 6/1999 | Barth et al. | 711/105 |
| 5,996,042 A | * | 11/1999 | Pawlowski et al. | 711/105 |
| 6,003,121 A | * | 12/1999 | Wirt | 711/170 |
| 6,058,464 A | * | 5/2000 | Taylor | 711/217 |
| 6,065,092 A | * | 5/2000 | Roy | 711/5 |
| 6,067,593 A | * | 5/2000 | Schade | 710/126 |
| 6,076,139 A | * | 6/2000 | Welker et al. | 711/104 |
| 6,118,462 A | * | 9/2000 | Margulis | 345/521 |
| 6,125,421 A | * | 9/2000 | Roy | 711/5 |
| 6,252,821 B1 | * | 6/2001 | Nizar et al. | 365/238.5 |

OTHER PUBLICATIONS

Direct RDRAM 64/72– Mbit (256K×16/18×16d), Rambus Corporation, May 1997.*
Rambus: Performance for Large Memory Systems, Dec. 1999.*
Kumanoya et al. —IEEE, "Advances in DRAM Interfaces", Dec. 1995.*
Rambus (www.rambus.com)—"Applications for Rambus Interface Technology", Feb. 1998.*
Crispt, Proceedings of COMPCON 1996, "High Bandwidth DRAM Technology Reduces System Cost", Dec. 1996.*
Garret—IEEE—"RDRAMs: A New Speed Paradigm", Dec. 1994.*
Crisp, IEEE Micro—"Direct Rambus Technology: The New Main Memory Standard", Dec. 1997.*
Warmke—(www.rambus.com)—"Designing a Multimedia System with Rambus DRAMs", Dec. 1995.*

* cited by examiner

Primary Examiner—Kimberly McLean-Mayo
(74) Attorney, Agent, or Firm—Seth Z. Kalson

(57) ABSTRACT

A memory system comprising an expansion buffer and a memory expansion channel for connecting a large array of memory devices, such as Direct RDRAMs, to a memory controller. The memory devices are partitioned into subsets of memory devices so that each subset is connected to a unique memory channel for sending and receiving data. The expansion buffer and memory expansion channel provide communication with the memory devices via control packets on the expansion bus, where each control packet has a channel identification field to store a channel identifier; and via request packets on the expansion bus, where each request packet is associated with a control packet. The expansion buffer routes a request packet to a unique channel based upon the channel identifier stored in the associated control packet.

37 Claims, 43 Drawing Sheets

Cascaded Expansion Buffers.

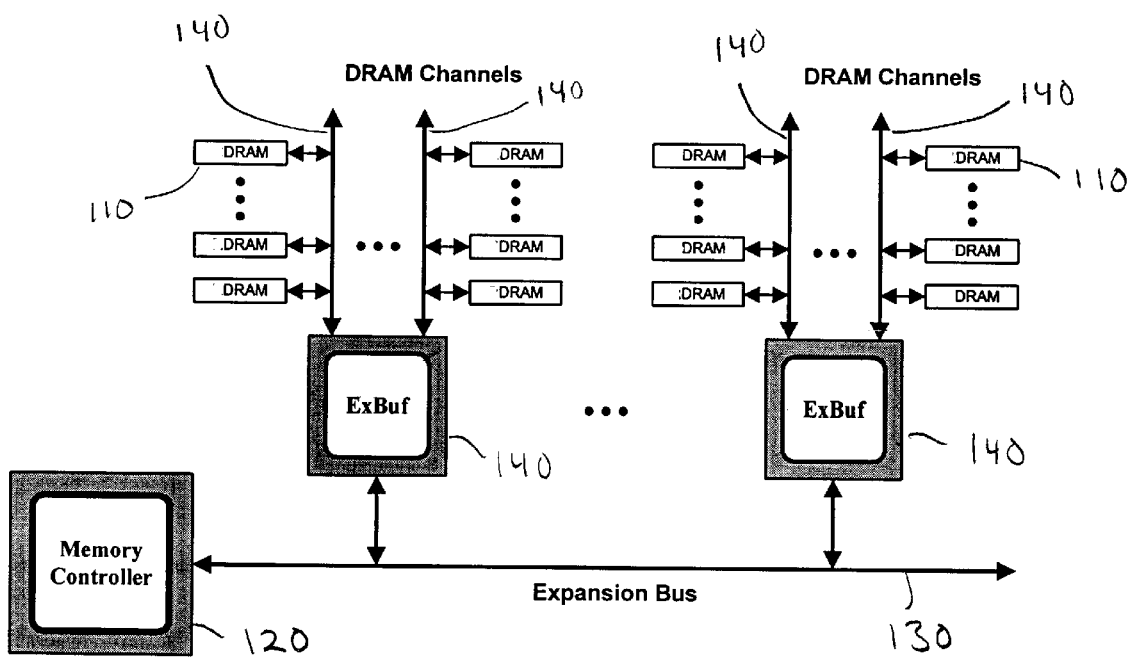
Figure 1: Expansion Channel Architecture

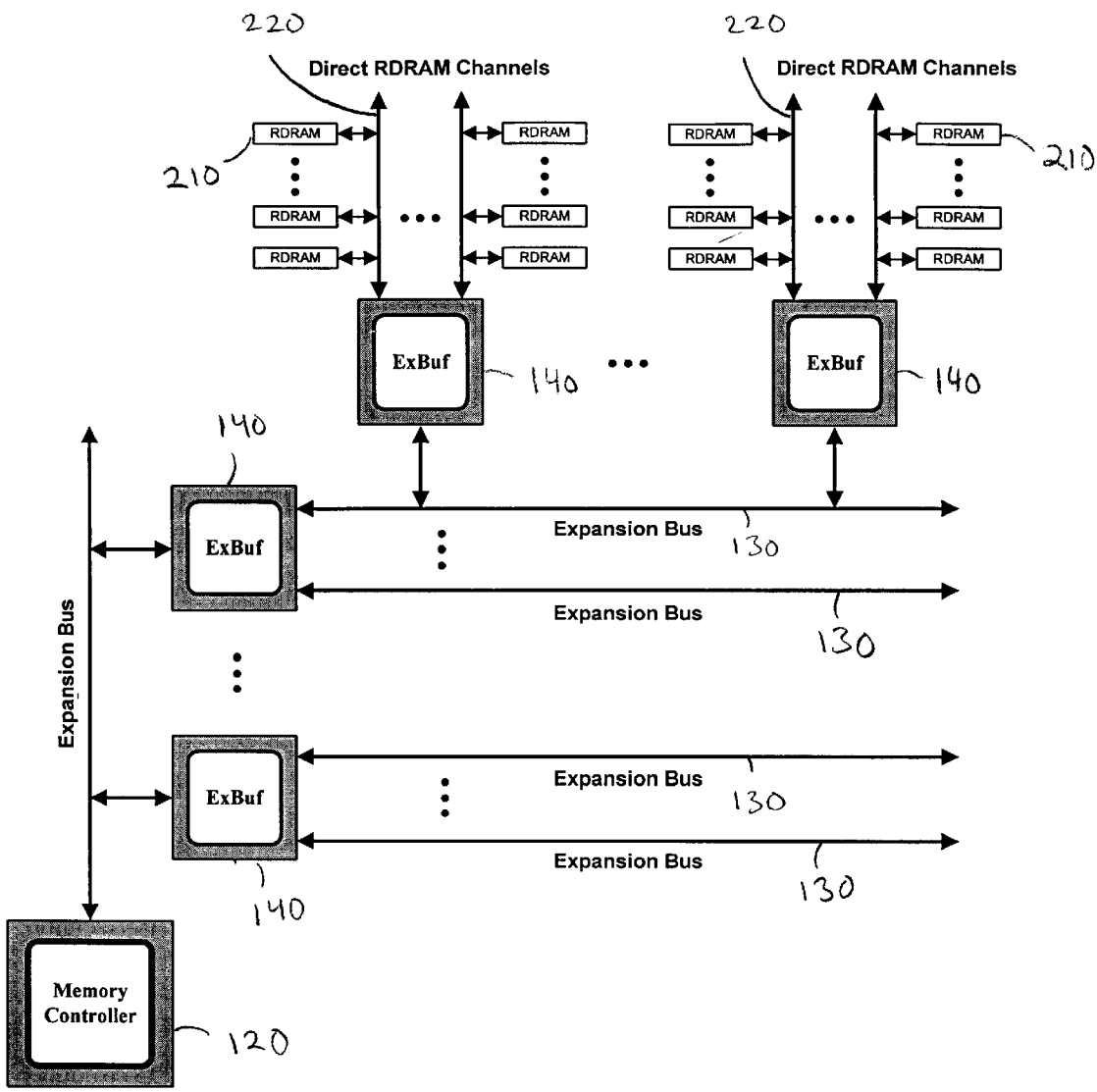
Figure 2: Cascaded Expansion Buffers.

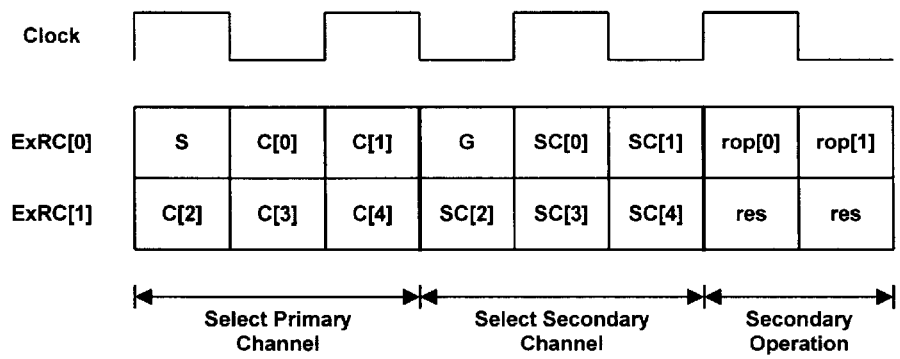
Figure 3: ExRCP Packet Format.

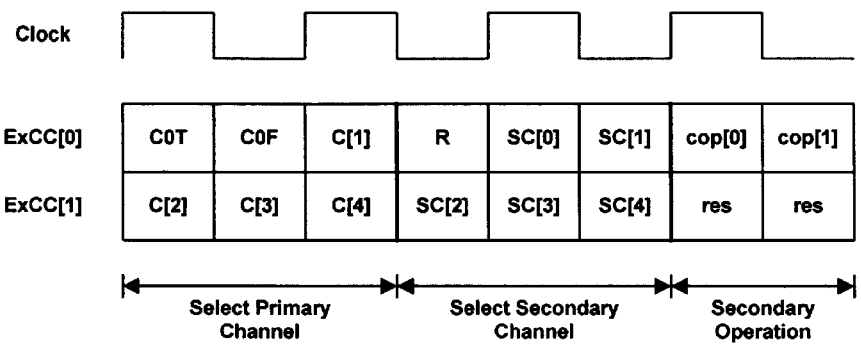

Figure 4: ExCCP Packet Format.

| | | |
|---|---|---|
| xRC₁ | xRC₂ | Expansion row control packet, shading indicates a write. |
| xA₁ | xP₂ | Expansion row request packet, A = activate, P = precharge. |
| A₁ | P₂ | Row request packet, A = active, P = precharge. |
| xCC₁ₐ | xCC₂ₐ | Expansion column control packet, shading indicates a write. |
| xRd₁ₐ | xWr₂ₐ | Expansion column request packet, Rd = read, Wr = write. |
| Rd₁ₐ | Wr₂ₐ | Column request packet, Rd = read, Wr = write. |
| 1a | 2a | Data packet. |
| x1a | x2a | Expansion data packet. |

Figure 5: Legend for Timing Diagrams.

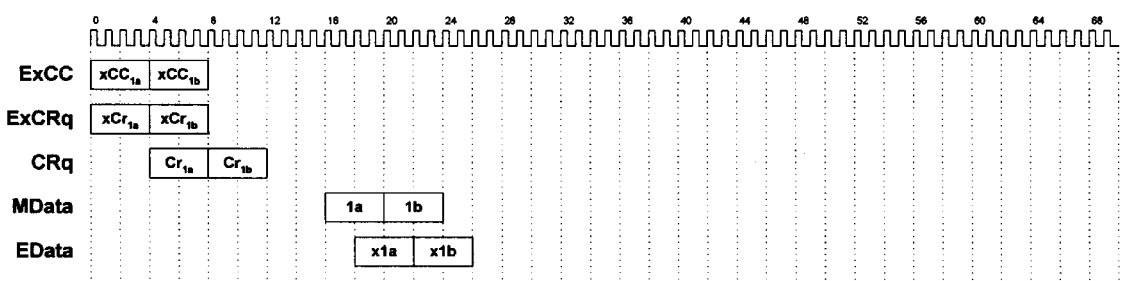
Figure 6: Read page hit access.

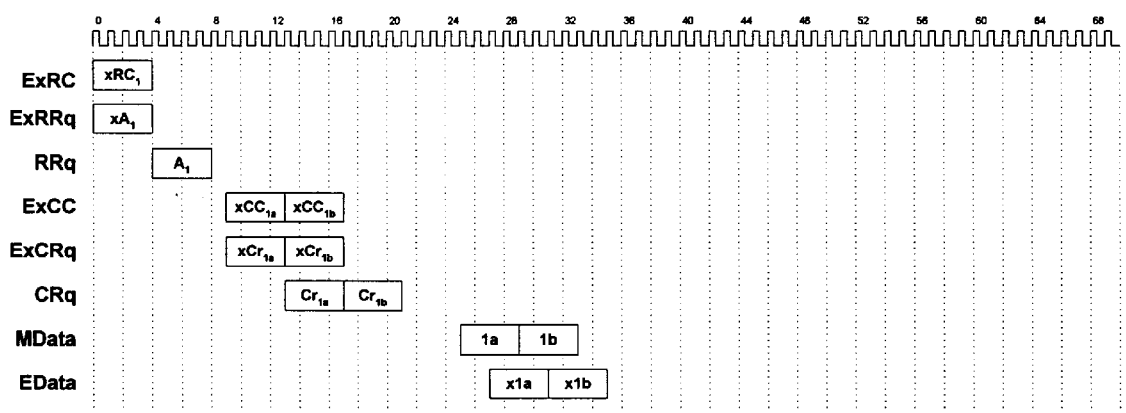
Figure 7: Read page empty access.

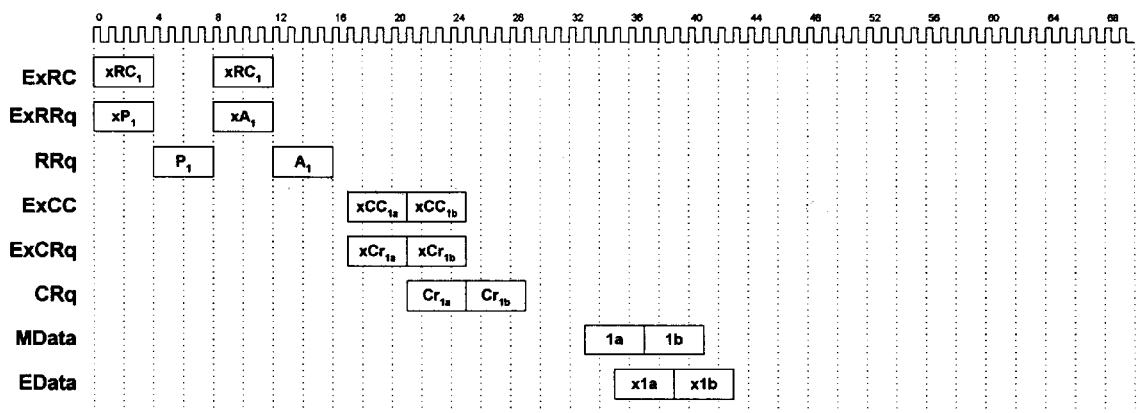
Figure 8: Read page miss access.

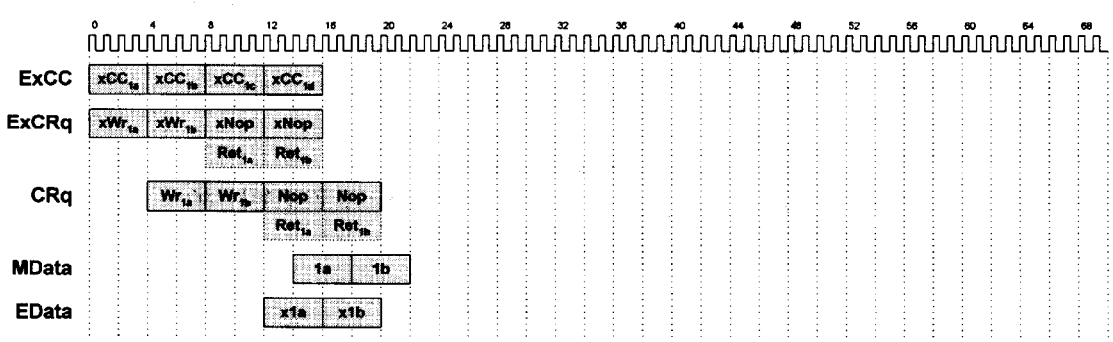
Figure 9: Write page hit access.

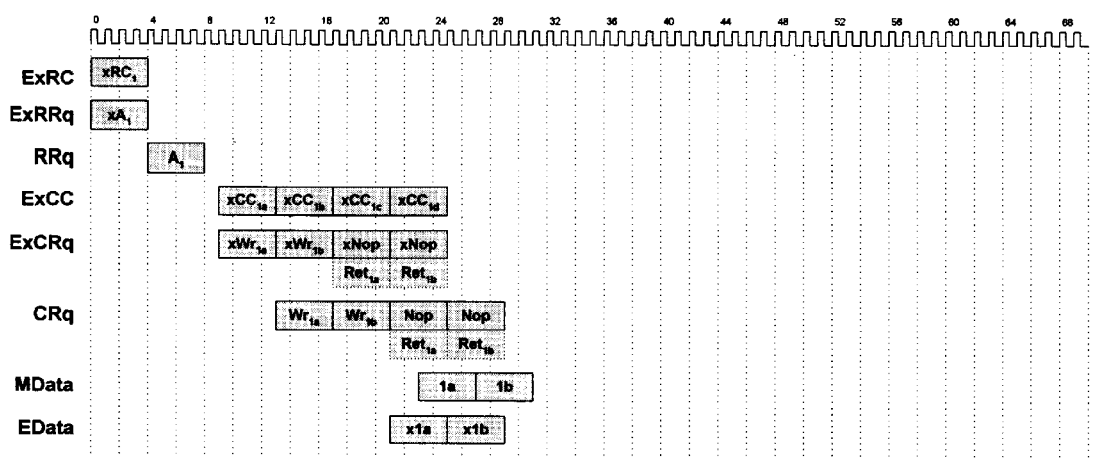
Figure 10: Write page empty access.

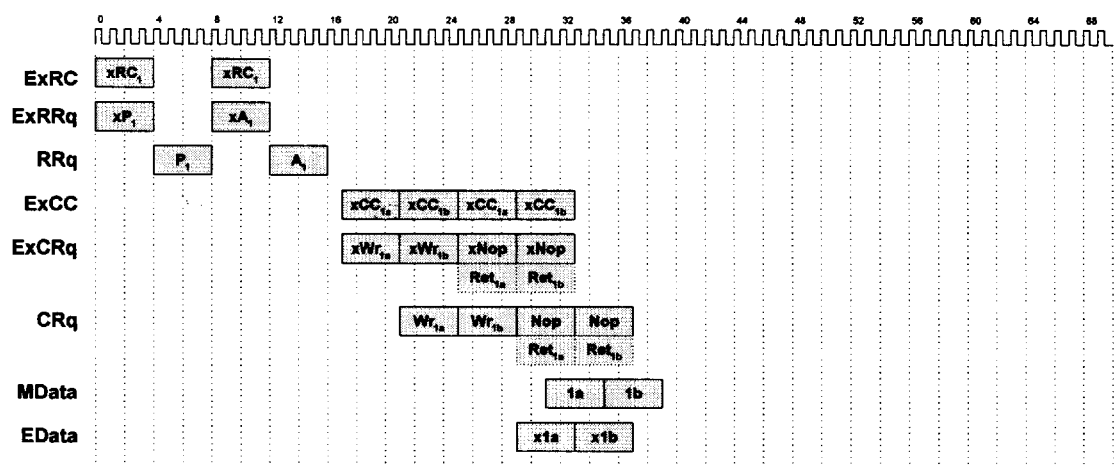
Figure 11: Write page miss access.

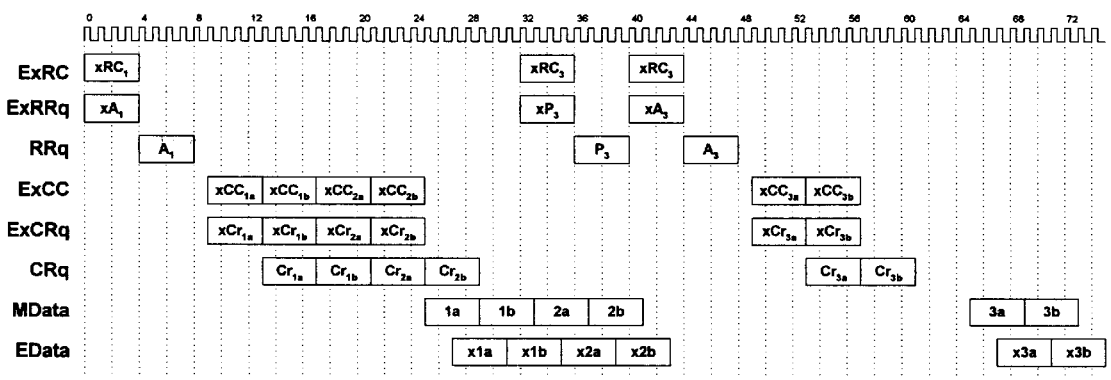
Figure 12: Read page empty, read page hit, read page miss.

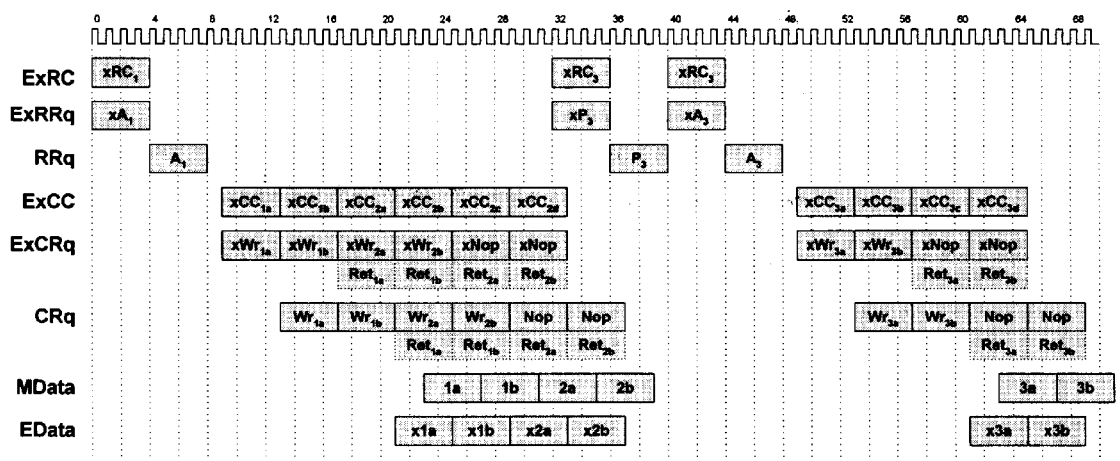
Figure 13: Write page empty, write page hit, write page miss.

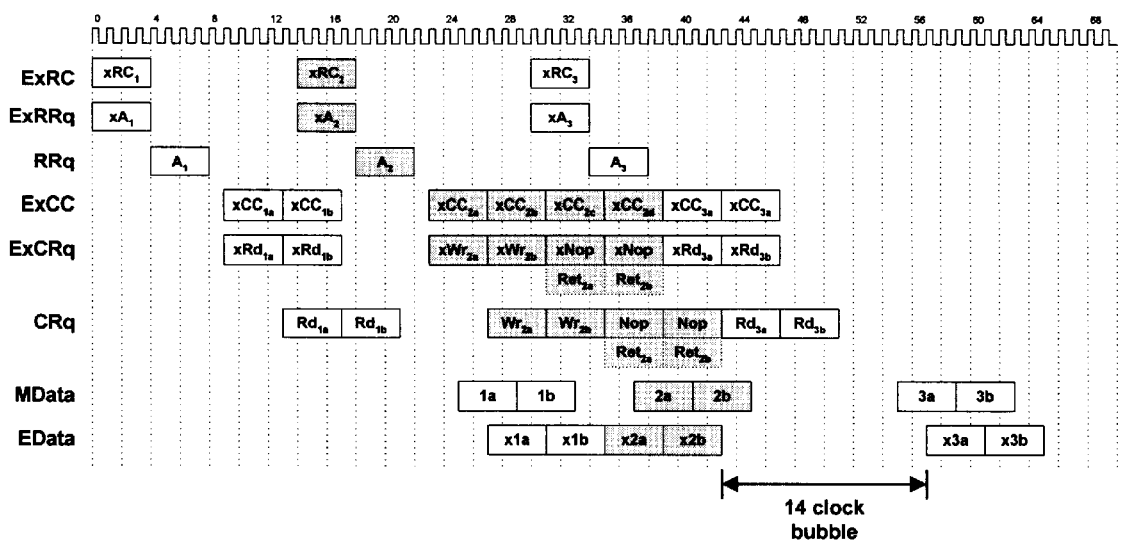
Figure 14: Read - Write - Read all to the same device.

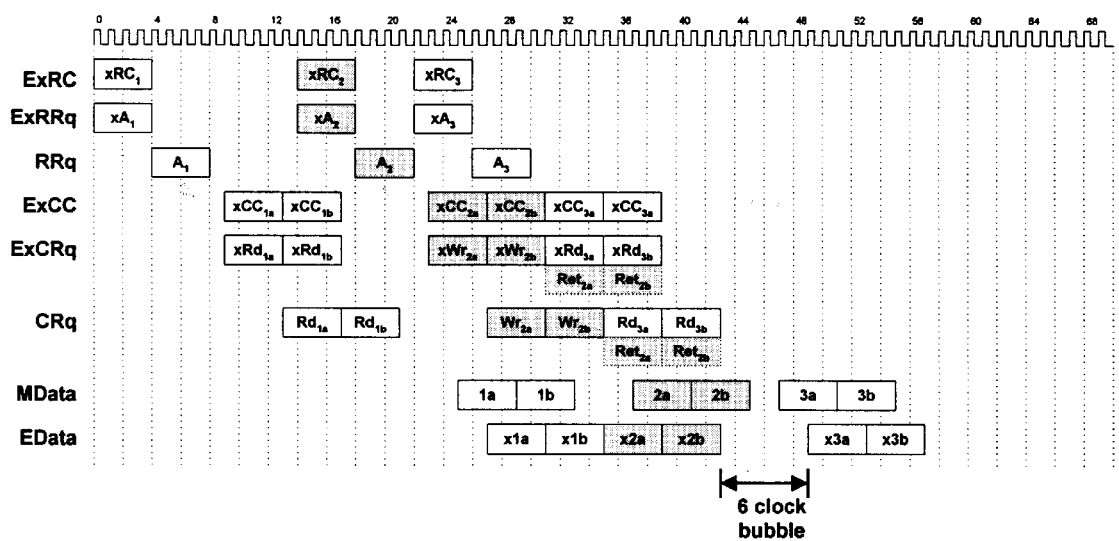
Figure 15: Read - Write same device, Read same channel different device.

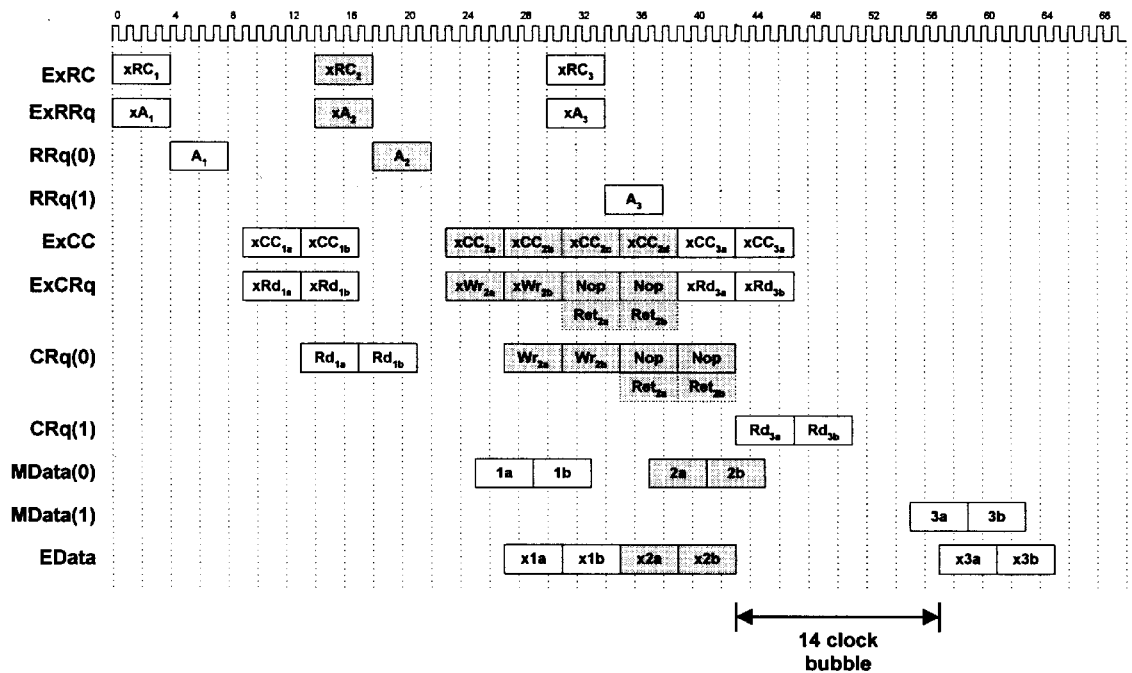
Figure 16: Read - Write same device, Read different channel.

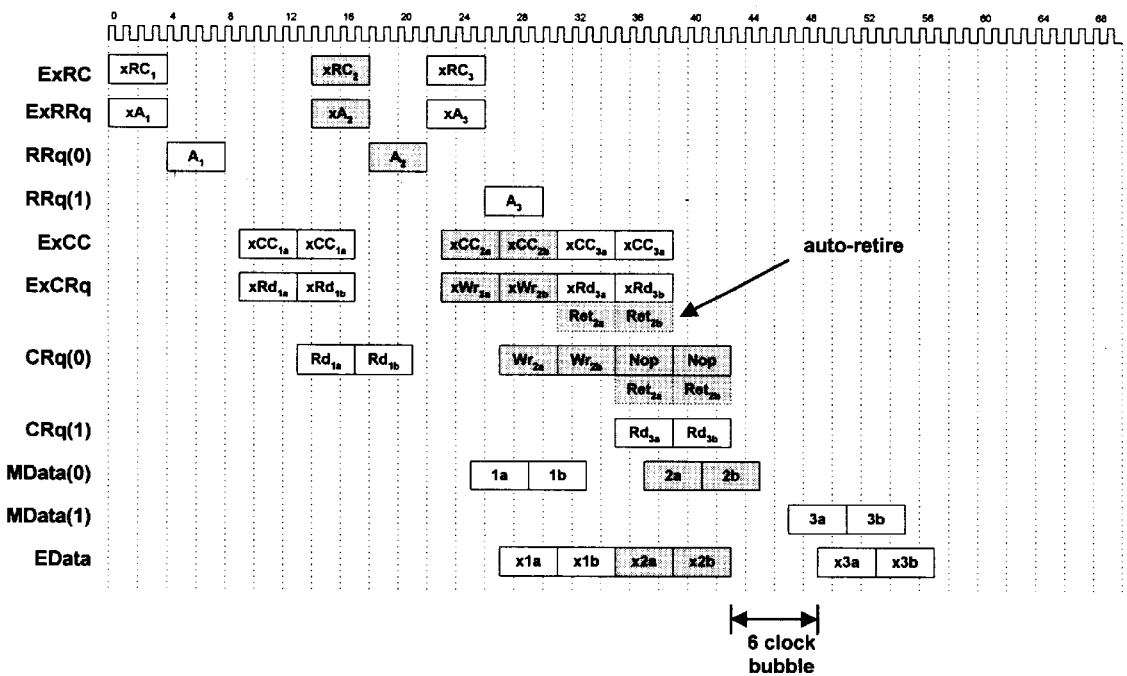
Figure 17: Read - Write same device, Read different channel, auto retire.

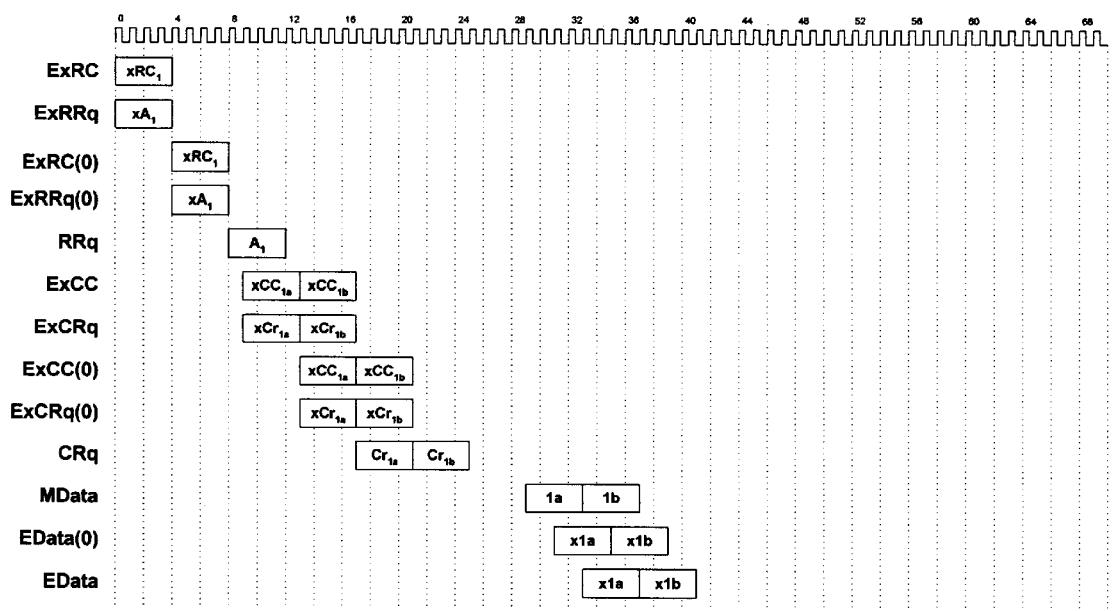
Figure 18: Page Empty Read through Two Levels of ExBuf.

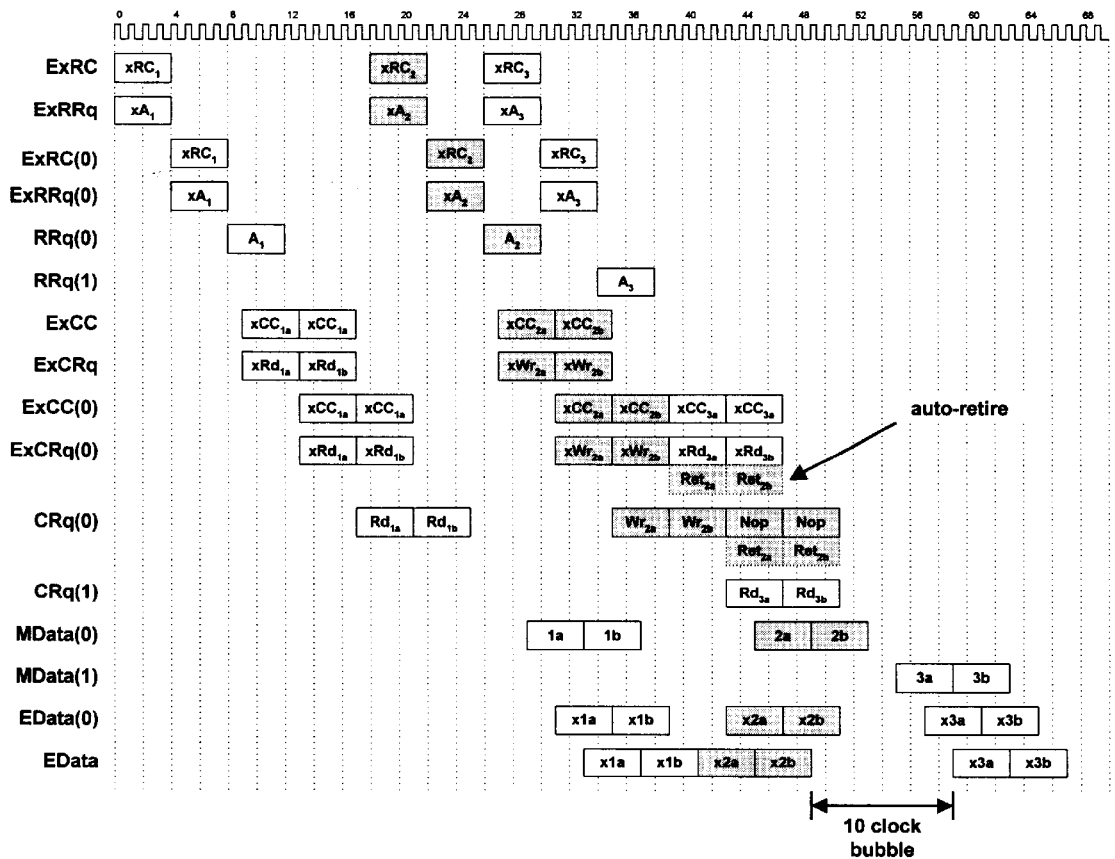
Figure 19: Read-Write Same, Read Different Channel, Two Levels of ExBuf.

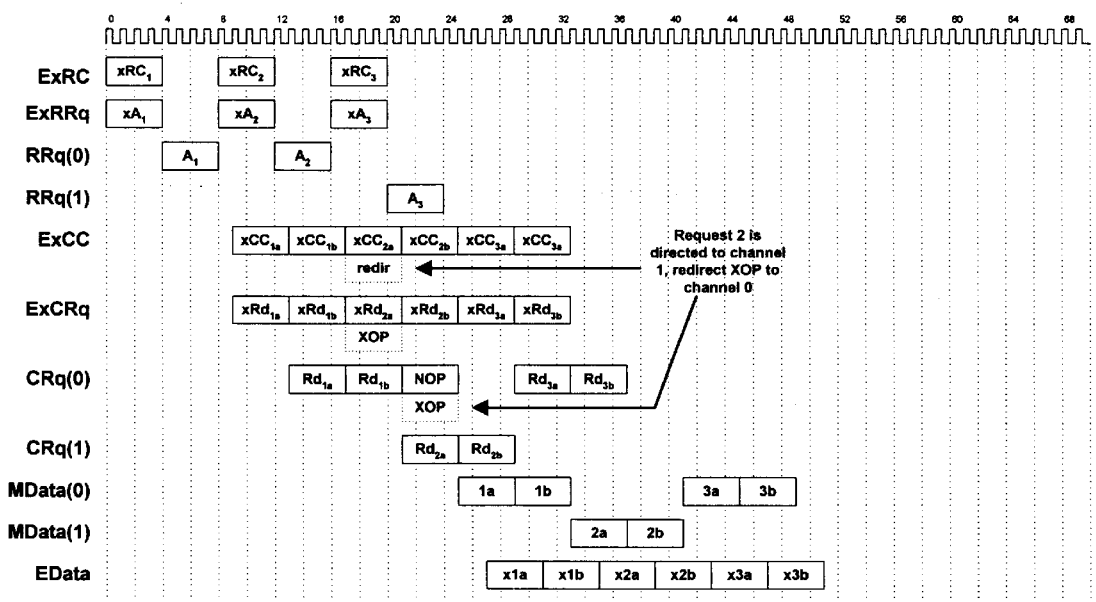
Figure 20: XOP Redirection.

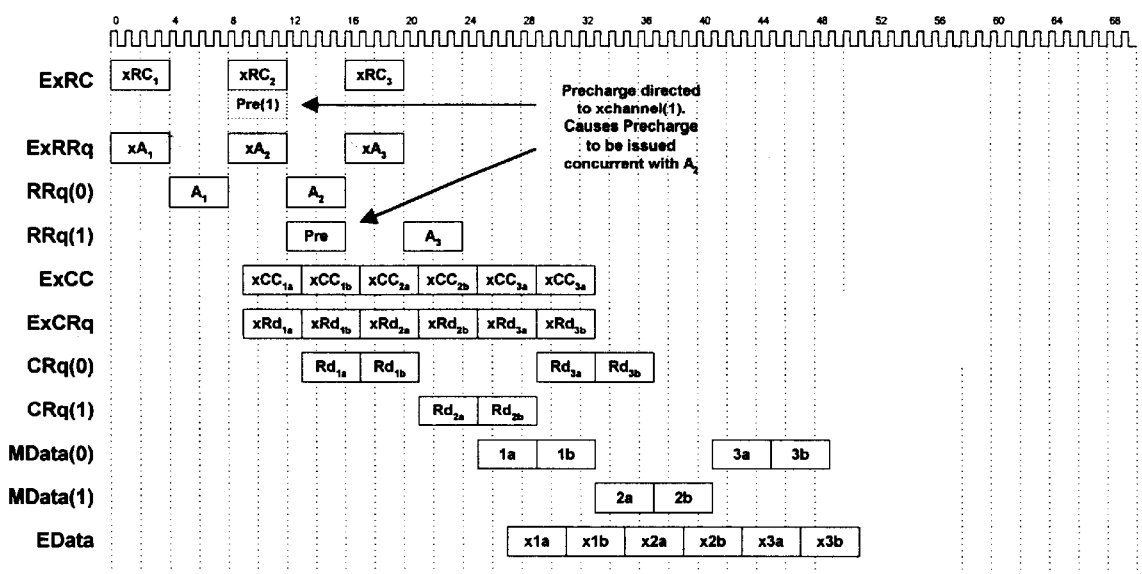
Figure 21: Broadcast Precharge Concurrent with Read Accesses.

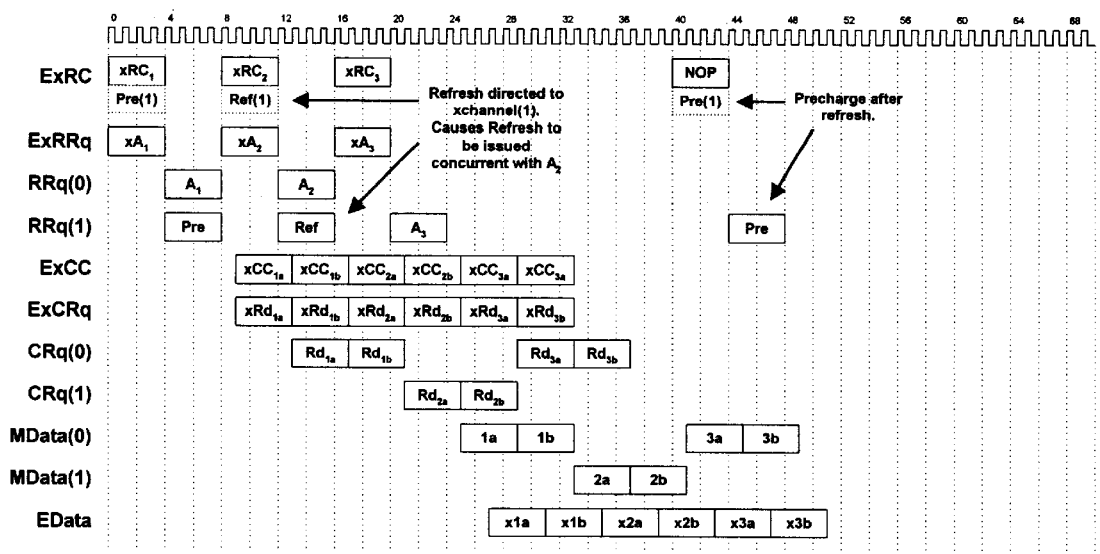
Figure 22: Broadcast Refresh concurrent with Read Accesses.

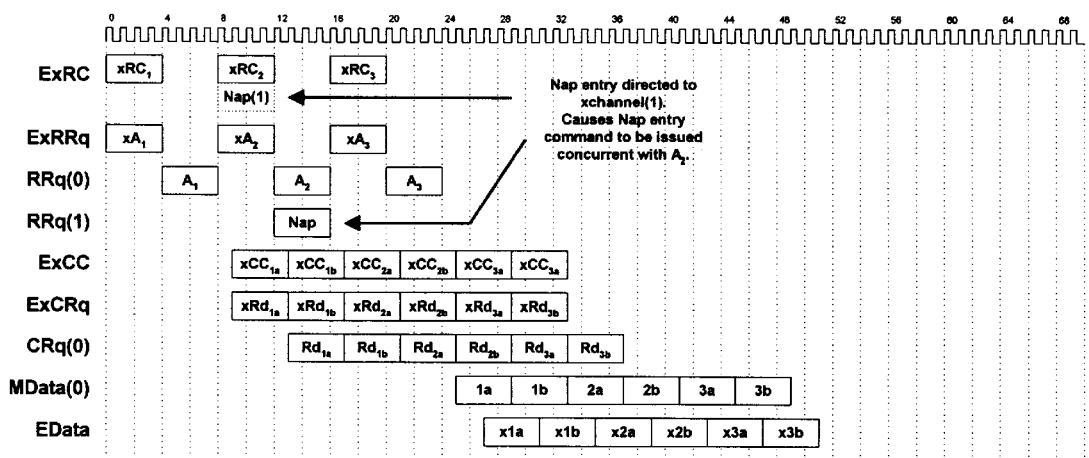
Figure 23: Nap Entry Sequence.

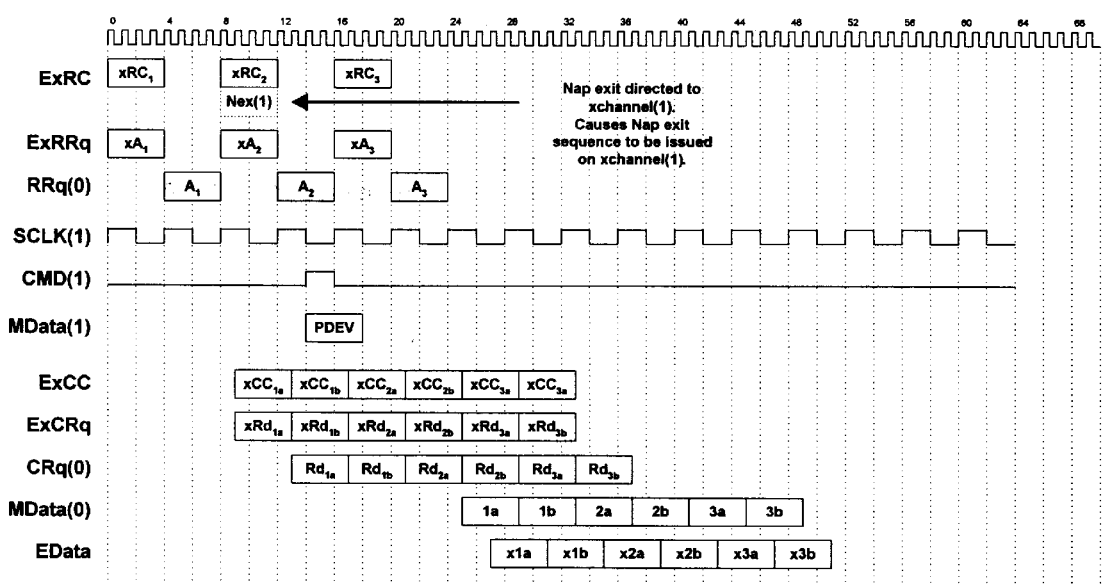
Figure 24 Nap Exit Sequence.

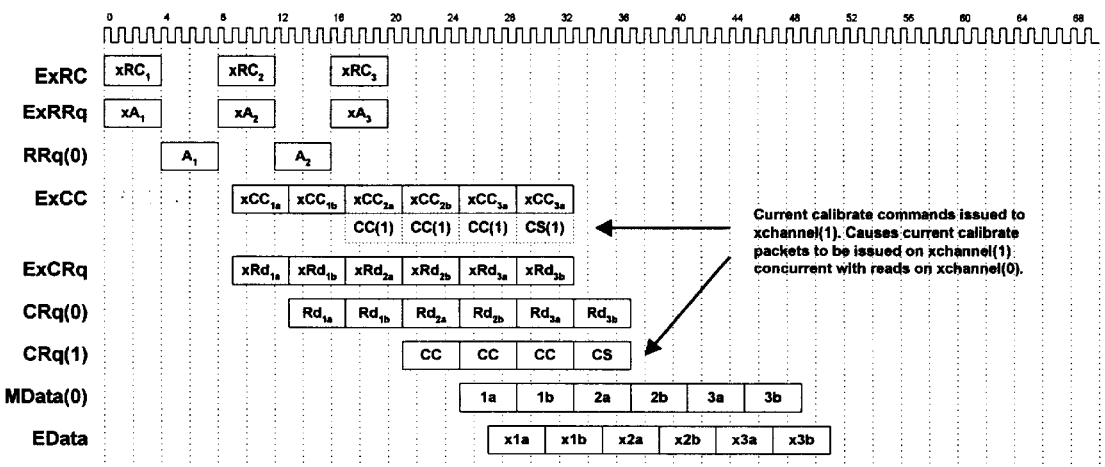
Figure 25: Current Calibration on an RDRAM Channel.

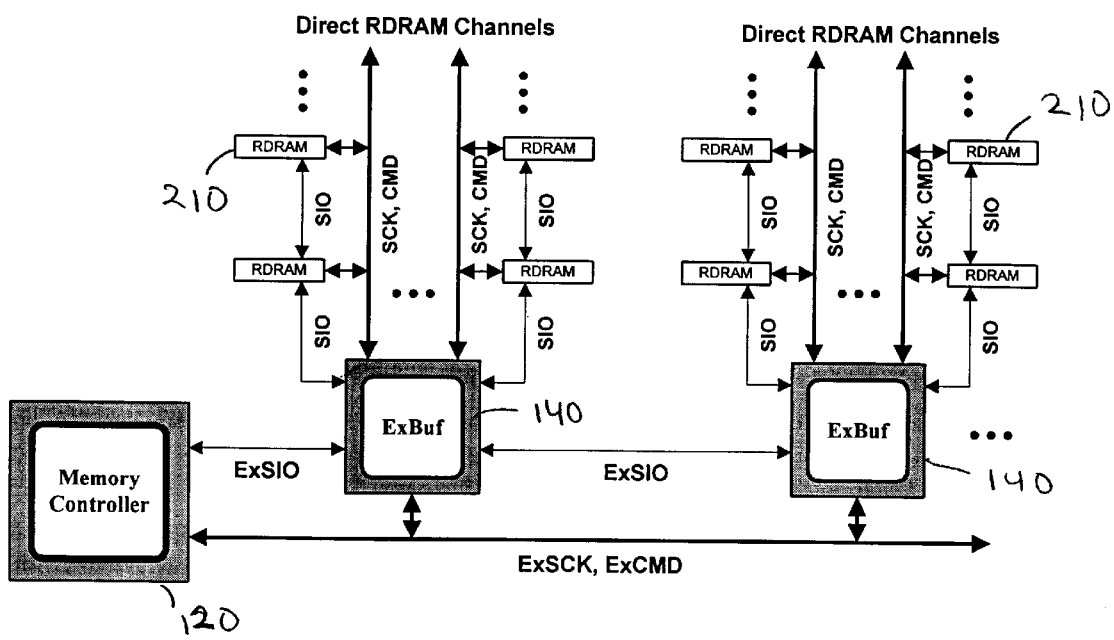
Figure 26: Connection of CMOS Signals.

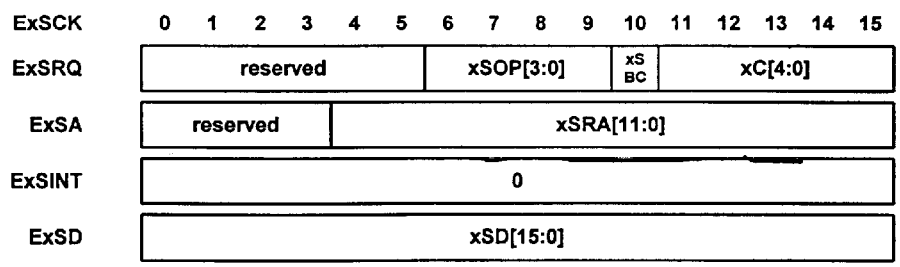
Figure 27: Expansion Bus Serial Packet Formats.

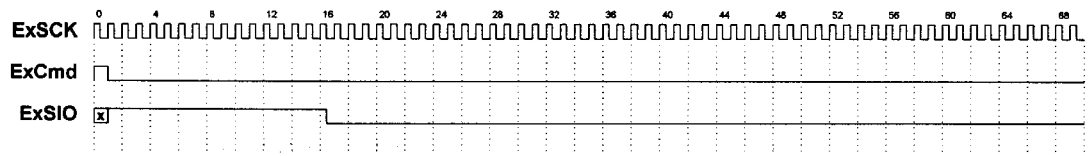
Figure 28: ExSIO Reset Sequence.

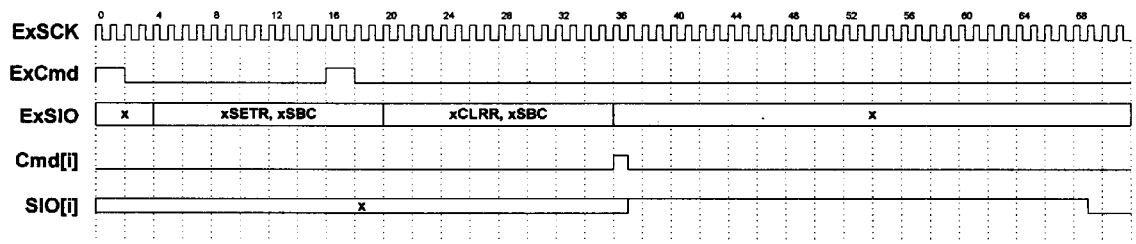
Figure 29: ExBuf Reset Sequence.

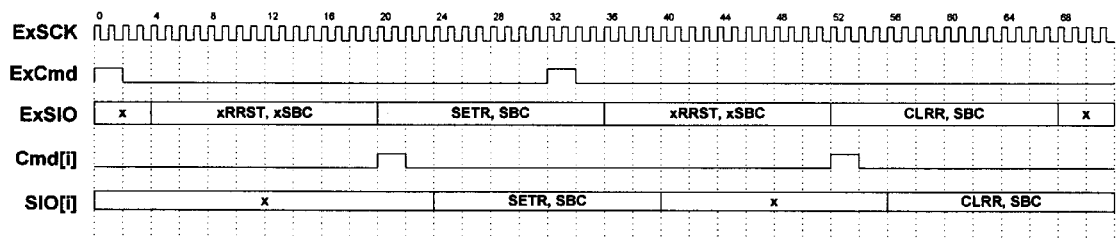
Figure 30: RDRAM Reset Sequence.

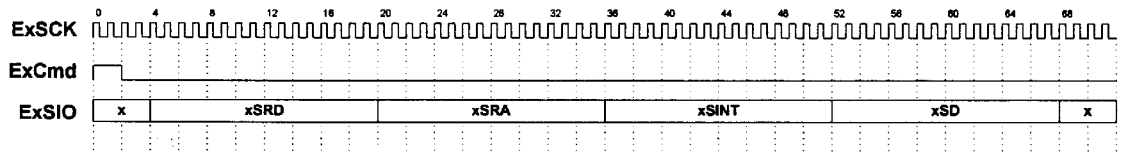
Figure 31: ExBuf Register Read.

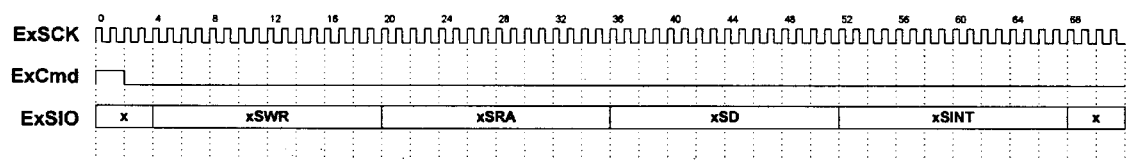
Figure 32: ExBuf Register Write.

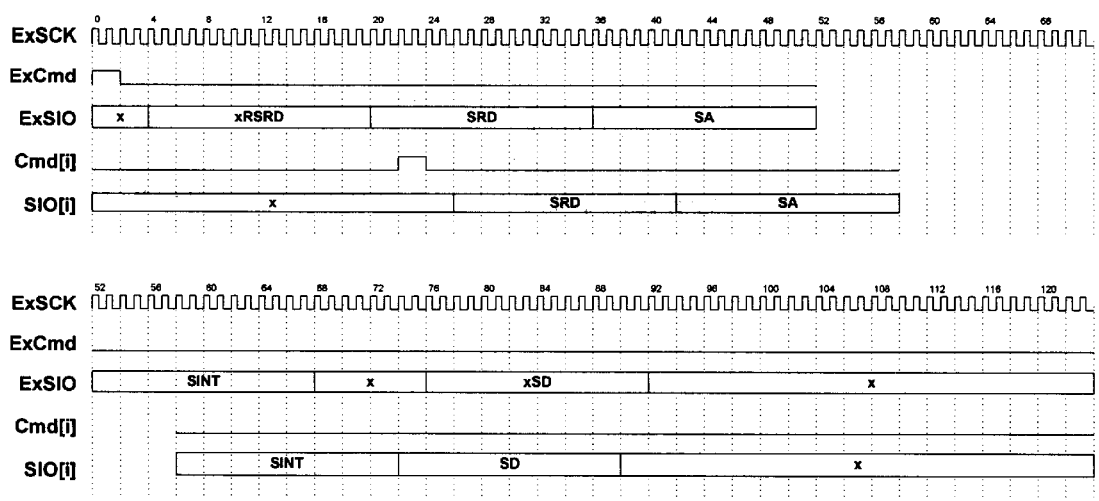
Figure 33: RDRAM Register Read from the Expansion Serial Bus.

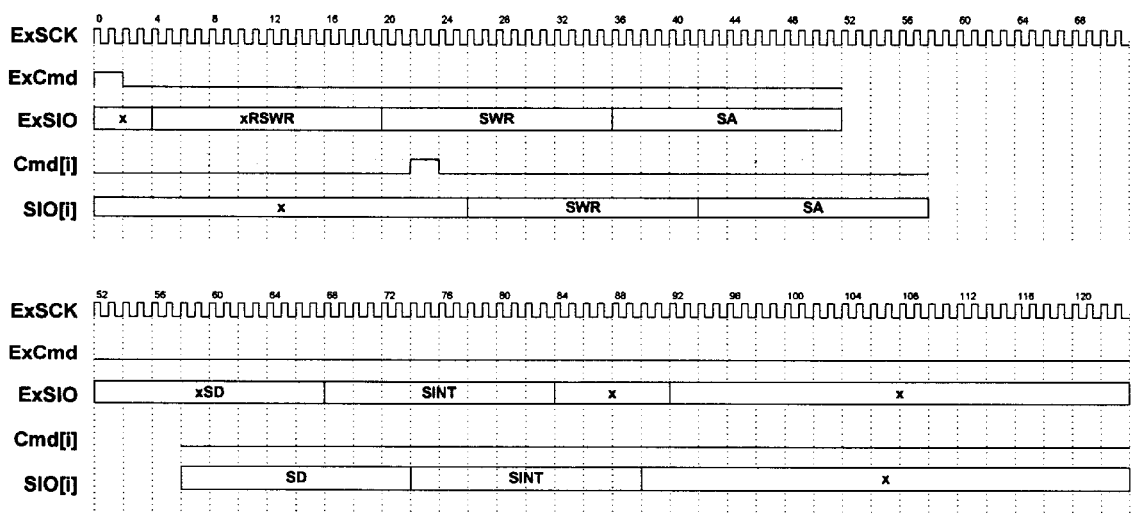
Figure 34: RDRAM Register Write from the Expansion Serial Bus.

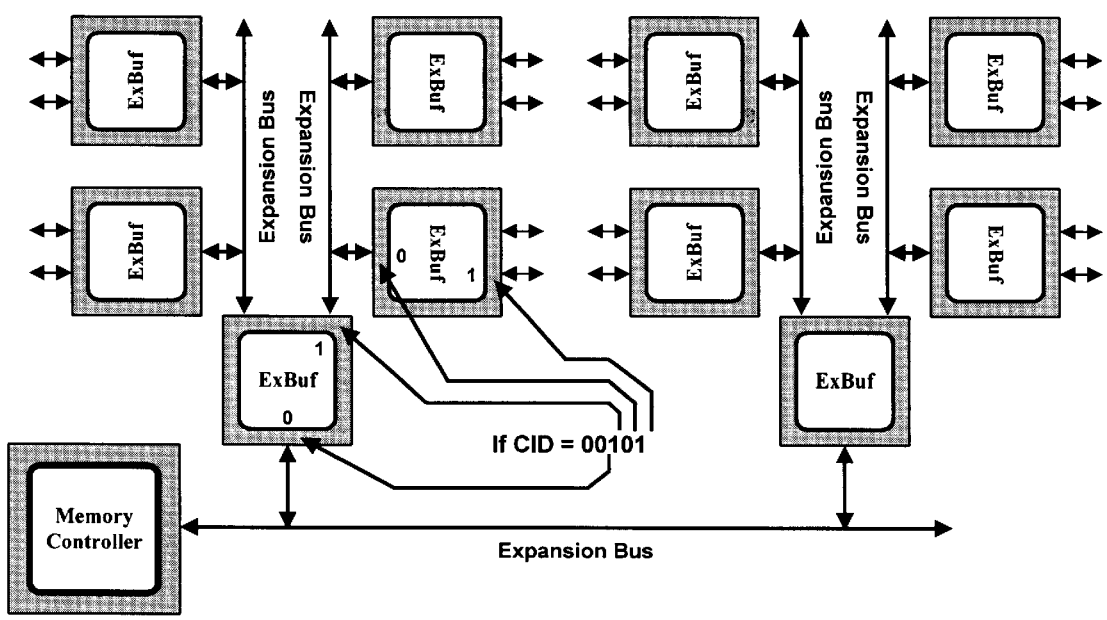
Figure 35: Multilevel Memory System Example.

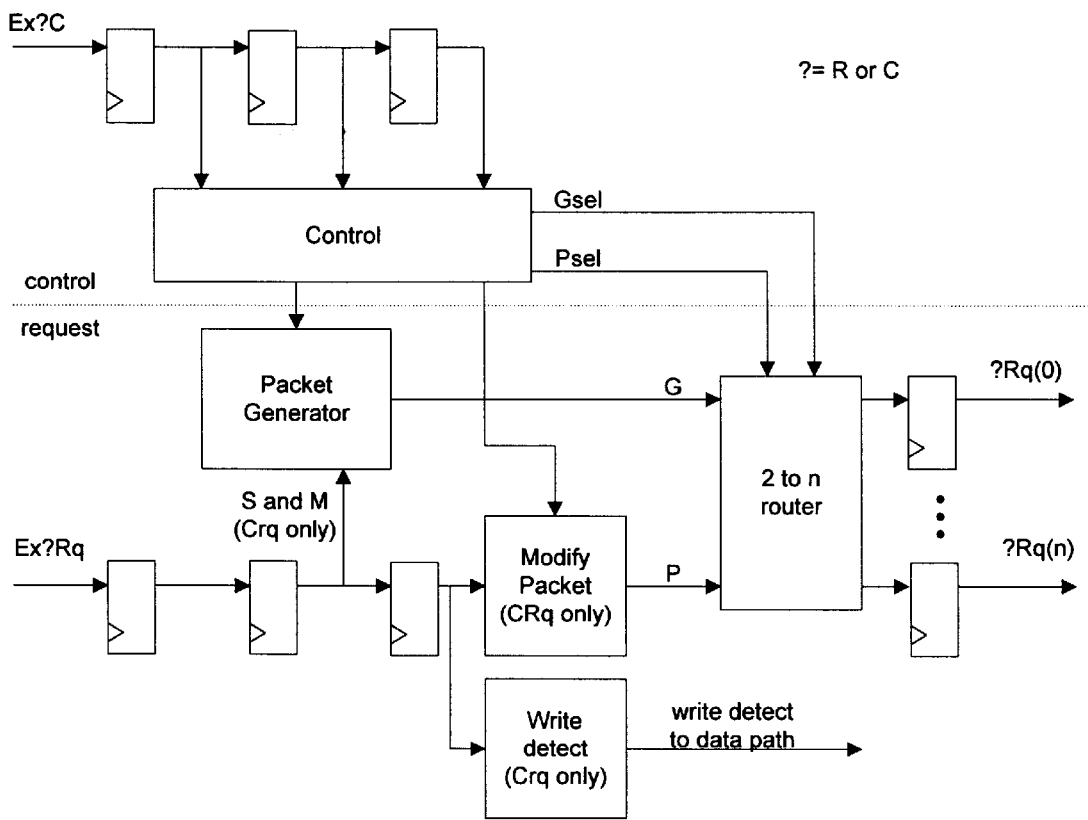
Figure 36: Control and Request Paths.

Original Packet    Zero out DX, XOP, and BX in cycles 2 and 3.
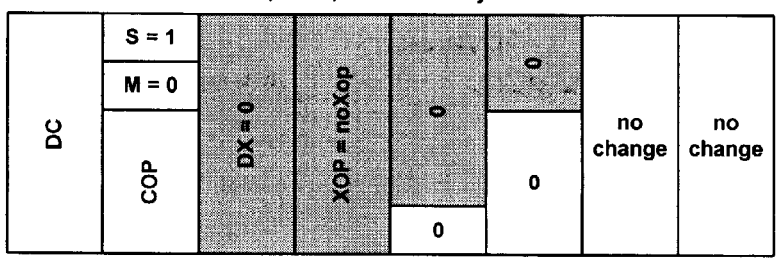
Redirected Packet    Contains S, M, DX, XOP, and BX from original packet, other fields are 0.
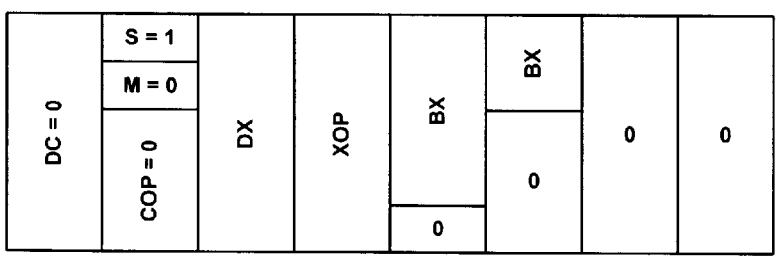
Figure 37: Packet Modifications for XOP Redirection.

Figure 38: Packet Modifications for Byte Mask Redirection.

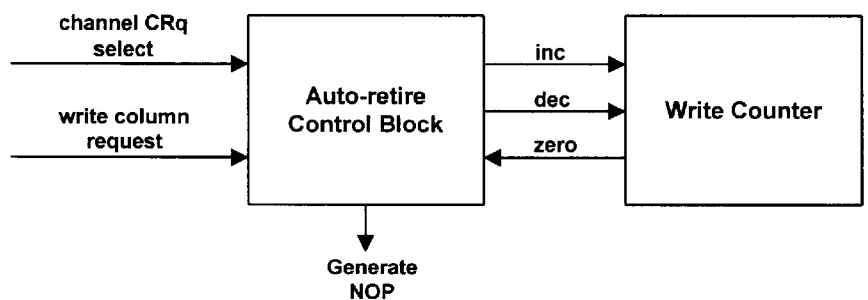
Figure 39: Structures for Auto-retire.

| DC = 0 | S = 1 | DX = 0 | XOP = NOXOP | 0 | 0 | 0 | 0 |
|---|---|---|---|---|---|---|---|
| | M = 0 | | | | | | |
| | COP = NOP | | | | | | |

Figure 40: Auto-retire Packet Format.

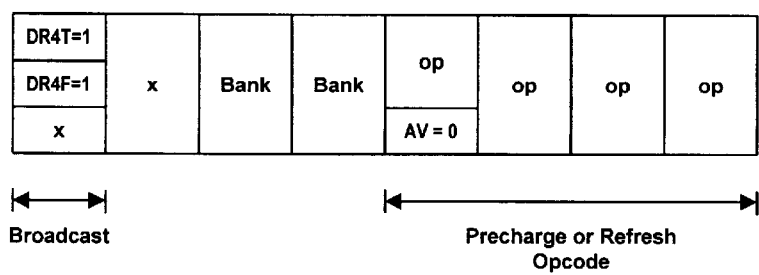
Figure 41: Precharge or Refresh Packet Format.

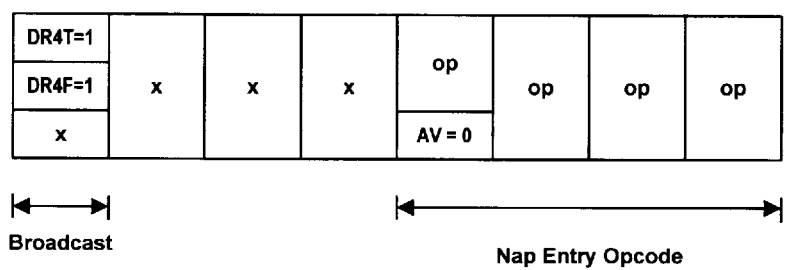
Figure 42: Nap Entry Packet Format.

Figure 43: Current Calibrate Packet Format.

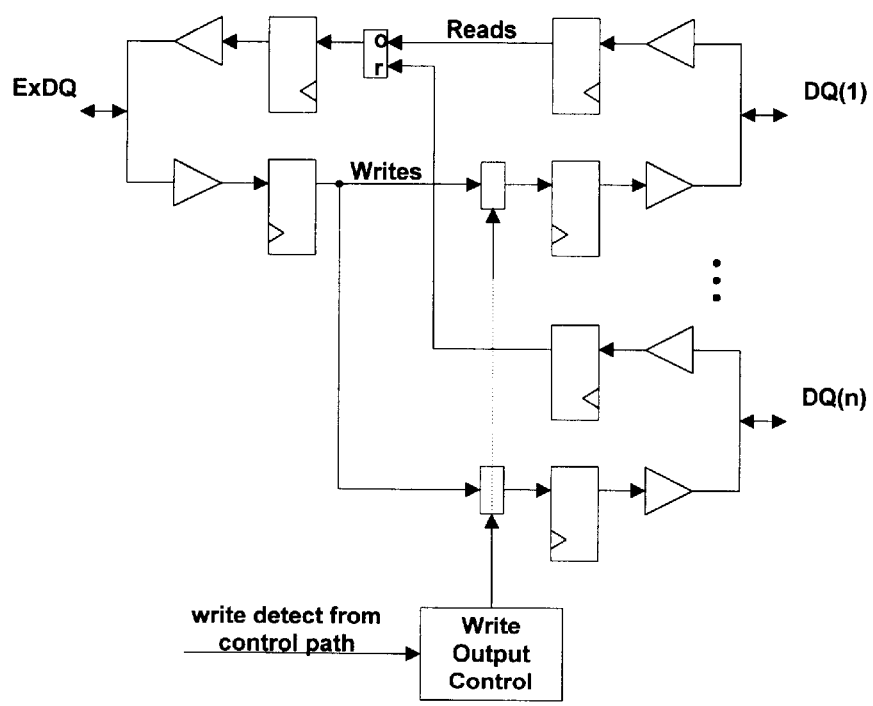
Figure 44: ExBuf Data Path.

MEMORY EXPANSION CHANNEL FOR PROPAGATION OF CONTROL AND REQUEST PACKETS

FIELD OF INVENTION

The present invention relates to memory systems, and more particularly, to a memory expansion channel for connecting arrays of memory devices to a memory controller.

BACKGROUND

Interleaved banks of memory cells can increase memory performance when sequential accesses to memory addresses involve different banks of memory. Interleaved banks of memory cells, along with interface circuits, have been integrated on a single die. For example, Rambus Inc. provides technology for an integrated memory device (e.g., Direct RDRAM™) employing interleaved banks of memory cells, along with a protocol for connecting a number of such memory devices to a single channel, called a Direct Rambus™ Channel. (Direct Rambus™ Channel and Direct RDRAM™ are registered trademarks of Rambus Inc., Mountain View, Calif.)

However, there are limits to the number of Direct RDRAMs that may be supported by a Direct Rambus Channel. Therefore, it is desirable to provide a memory architecture by which a large number of Direct RDRAMs may be connected to a memory controller. Furthermore, it is desirable that the number of Direct RDRAMs supported by a memory controller can be scaled with minimal impact upon the complexity and performance of the memory controller.

BRIEF DESCRIPTION OF THE DRAWINGS

FIG. 1 is an embodiment of a Memory Expansion Channel.

FIG. 2 is an embodiment of a Memory Expansion Channel with cascaded Expansion Buffers.

FIG. 3 illustrates an ExRCP packet format.

FIG. 4 illustrates an ExCCP packet format.

FIG. 5 is a legend for timing diagrams.

FIG. 6 is a timing diagram for a read page hit access.

FIG. 7 is a timing diagram for a read page empty access.

FIG. 8 is a timing diagram for a read page miss access.

FIG. 9 is a timing diagram for a write page hit access.

FIG. 10 is a timing diagram for a write page empty access.

FIG. 11 is a timing diagram for a write page miss access.

FIG. 12 is a timing diagram for a read page empty, read page hit, and read page miss.

FIG. 13 is a timing diagram for a write page empty, write page hit, and write page miss.

FIG. 14 is a timing diagram for a read-write-read, all to the same memory device.

FIG. 15 is a timing diagram for a read-write to a memory device on a channel, followed by a read to the same channel but to a different memory device.

FIG. 16 is a timing diagram for a read-write to a memory device on a channel, followed by a read to a different channel.

FIG. 17 is a timing diagram for a read-write to a memory device on a channel, followed by a read to a different channel, followed by an auto retire.

FIG. 18 is a timing diagram for a page-empty-read through two levels of expansion buffers.

FIG. 19 is a timing diagram for a read-write to a memory device on a channel, followed by a read to a different channel, where there are two levels of expansion buffers.

FIG. 20 is a timing diagram for a XOP redirection.

FIG. 21 is a timing diagram for a broadcast precharge concurrent with read accesses.

FIG. 22 is a timing diagram for a broadcast refresh concurrent with read accesses.

FIG. 23 is a timing diagram for a Nap entry sequence.

FIG. 24 is a timing diagram for a Nap exit sequence.

FIG. 25 is a timing diagram for a current calibration on a Direct Rambus Channel.

FIG. 26 is an embodiment of a Memory Expansion Channel indicating connections for CMOS signals.

FIG. 27 illustrates Expansion Bus serial packet formats.

FIG. 28 is a timing diagram for an ExSIO reset sequence.

FIG. 29 is a timing diagram for an ExBuf reset sequence.

FIG. 30 is a timing diagram for a Direct RDRAM reset sequence.

FIG. 31 is a timing diagram for an ExBuf register read.

FIG. 32 is a timing diagram for an ExBuf register write.

FIG. 33 is a timing diagram for a Direct RDRAM register read from the Expansion bus.

FIG. 34 is a timing diagram for a Direct RDRAM register write from the Expansion bus.

FIG. 35 is an embodiment of a Memory Expansion Channel with more than one level.

FIG. 36 is a high-level circuit diagram for control and request paths.

FIG. 37 illustrates packet modifications for XOP redirection.

FIG. 38 illustrates packet modifications for byte mask redirection.

FIG. 39 is a high-level circuit structure for auto-retires.

FIG. 40 illustrates an auto-retire packet format.

FIG. 41 illustrates a precharge or refresh packet format.

FIG. 42 illustrates a Nap entry packet format.

FIG. 43 illustrates a current calibrate packet format.

FIG. 44 is a high-level circuit diagram for an ExBuf data path.

DETAILED DESCRIPTION OF EMBODIMENTS

FIG. 1 shows an embodiment of an architecture for a Memory Expansion Channel to connect arrays of DRAMs (dynamic random access memory) 110 to memory controller 120. Memory controller 120 provides communication to one or more microprocessors via one or more other busses, not shown. In one particular embodiment, the DRAMs are Direct RDRAMs. However, embodiments are not limited to Direct RDRAMs.

When an embodiment employs Direct RDRAMs, we will use in these letters patent the command names, opcodes, timing parameter symbols, and other appropriate notation as used for Direct RDRAM devices, which can be found in data sheets provided by Rambus Inc.

Two main components to the architecture of FIG. 1 are Expansion Bus (ExBus) 130 and Expansion Buffers (ExBuf) 140. Expansion Bus 130 is an interconnect used to interface memory controller 120 with Expansion Buffers 140. Each Expansion Buffer connects to one or more DRAM channels 140. A DRAM channel provides communication to the DRAMs connected to it. If the DRAMs are Direct RDRAMs, then the DRAM channels are Direct Rambus Channels (also referred to as Direct RDRAM Channels). In general, there may be b Expansion Buffers and r Direct RDRAM Channels, thereby providing memory expansion to br Direct RDRAM Channels. In practice, the number of ExBufs supported by a channel will be limited by electrical and clocking considerations. The number of Direct Rambus Channels for each ExBuf will be limited by the constraints of packaging and signal quality.

A Memory Expansion Channel architecture according to embodiments of the present invention allows for the cascading of ExBufs, as illustrated in FIG. 2. In the particular embodiment of FIG. 2, Direct RDRAMs 120 and Direct Rambus Channels 220 are shown. Cascading ExBufs enables more memory expansion in light of the practical limits described above. For example, if a single Expansion Bus is limited to 8 ExBufs because of electrical constraints, then second level ExBufs with a fan-out of two DRAM channels can be used to double the supported memory. Cascading ExBufs accommodates the placement of the memory system some distance from memory controller 120. By using a second level of one or two ExBufs, the connection to memory controller 120 becomes more like a point-to-point connection. This allows a greater distance from memory controller 120 to the second level ExBufs.

In embodiments employing Direct RDRAMs, a Memory Expansion Channel should be a superset of the Direct Rambus Channel, and should utilize the Direct RDRAM signals. As described later, additional signals are needed to control the pipelining of data to and from the set of Direct RDRAM Channels on the Memory Expansion Channel. This minimizes the overhead by sharing as many signals as possible with the memory channel. With the superset approach, Direct RDRAM command packets on the Memory Expansion Channel can be forwarded to the targeted Direct RDRAM Channel. This minimizes the latency added by the ExBuf. In embodiments employing Direct RDRAMs, the functionality of the Direct Rambus Channel is be preserved, and all fields in the Direct RDRAM packets should remain intact to be used by Direct RDRAM devices in an Expansion Memory Channel.

It is desirable that embodiments of the present invention achieve full bandwidth operation with as little impact on latency as possible. Effective bandwidth should not be impacted, i.e., the Memory Expansion Channel protocol should not add inefficiencies to pipelined memory accesses. There should be enough expansion channel control bandwidth to handle any overhead for managing the multitude of Direct Rambus Channels connected to the Memory Expansion Channel, and the impact of added bus turnaround cycles should be effectively hidden. In some embodiments, a lower bound for added latency is 5 clocks (12.5 ns at 400 Mhz), but for other embodiments it could be 6 to 8 clocks. These numbers will change with technology and are provided herein only as an example.

The refresh requirements on the Direct RDRAM Channel are more severe than in some other DRAM technologies. This is due to the larger number of banks of memory cells and smaller page sizes, which results in a larger number of rows per device. This requires a higher refresh rate. For example, in 64 Mbit Direct RDRAM devices with 1 KB pages, the refresh rate is 3.9 $\mu$s as compared to 15.625 $\mu$s for 64 Mbit SDRAM.

It is expected that in some embodiments employing Direct RDRAM Channels, simultaneously refreshing all Direct RDRAM Channels is not possible because of potentially large current surges, so channel refreshes should be staggered. As a result, the refresh rate needs to be higher when multiple Direct Rambus Channels are present. For example, given the above case of 64 Mb devices with 1 KB page and 32 memory channels, the rate becomes 122 ns. With this high refresh rate, it is not acceptable to use memory access control bandwidth to send the refresh commands. To accommodate these rates, the embodiments of the Memory Expansion Channel should provide enough control bandwidth to allow refresh operations to be carried out in parallel with memory reads and writes.

The standby current for a Direct RDRAM is ~100 mA. This results in a high system power for a large memory array in standby. For example, in a 32 channel system the current would be 102 Amps, which is 268 W at 2.625V. As a consequence of this high standby power, embodiments with large arrays of Direct RDRAM devices should keep many, if not most, of the devices in the Nap mode. In Nap, the power is ~20 mW per device. (If all 32 channels were in Nap the total power would be 20 W.) The Memory Expansion Channel should provide command bandwidth for moving memory devices and. channels into and out of Nap without reducing the throughput of memory access operations to active channels.

The Expansion Bus comprises the set of signals used to transmit information to and from the Expansion Buffers and the protocol that defines the format and sequencing of this information. For embodiments employing Direct Rambus Channels, both the signals and protocol of the ExBus are a superset of their counterparts in the Direct Rambus Channel. Accesses may be pipelined with and across Direct RDRAM Channels, and sufficient control bandwidth should be provided so that channel service operations such as refresh can proceed in parallel with fully pipelined memory accesses.

For the Direct Rambus Channel there are two groups of high speed control signals, a high speed data bus utilizing Direct Rambus Signal Levels (RSL), and a group of low speed CMOS control signals. The control signal groups are referred to here as the Row Request Bus and the Column Request Bus. Each of these request busses has a request packet format associated with it, the Row Request Packet (RRQP) and the Column Request Packet (CRQP). Row and Column request packets can be pipelined to maximize data throughput to and from the memory.

In embodiments of the present invention, signals may be conceptually divided into two groups. One group comprises Expansion Control Bus signals, which provide for the control of memory requests. The other group comprises Expansion Bus Memory Request Signals, which carry memory requests that get directed to a particular memory channel of DRAMs. These signals are now described in more detail.

In order to achieve full bandwidth operation on a Memory Expansion Channel employing Direct Rambus Channels, all control operations are pipelined with the memory request packets. Furthermore, independent expansion control should be allocated for the RRQPs and CRQPs on the memory channel to maintain the variable RAS to CAS timings. This requirement may be met in embodiments by providing two expansion control busses, the Expansion Row Control bus (EXRC) and the Expansion Column Control bus (ExCC). See Table 1.

TABLE 1

Expansion Control Bus Signals

| Signal | Description |
| --- | --- |
| ExRC[1:0] | Expansion Row Control. These signals carry the expansion row control packets, ExRCP, from the memory controller to attached ExBufs. ExRC[1] is needed if more than 4 memory channels need to be supported. |
| ExCC[1:0] | Expansion Column Control. These signals carry the expansion column control packets, ExCCP, from the memory controller to attached ExBufs. ExCC[1] is needed if more than 4 memory channels need to be supported. |

As used herein, the notation [n:0] after a signal name x will indicate one of two things, depending upon context. In one context, x[n:0] will indicate that the signal x comprises n+1 component signals, each component signal carried by one of n+1 wires (along with the corresponding ground wires or plane). Within this context, the notation x[i] refers to that part of the signal x on wire i (and corresponding ground wire or plane). In another context, x[n:0] will indicate that x is a data packet having n+1 fields, each field being one bit wide. That is, the signal x may be thought of as being time-multiplexed over one wire. Within this context, x[i] will refer to field i of packet x.

Using the same notation x[n:0] and x[i] for these two contexts shouldn't be cause for confusion, for it will be clear from context which is meant. Furthermore, it should be clear to one of ordinary skill that the embodiments discussed here may be modified so the number of wires used to transmit a signal may be reduced by time-multiplexing.

Similarly, a signal that is described herein as time-multiplexed can be modified so as to be provided over more than one wire with less latency. There are clearly tradeoffs involved in trading physical wires for time-multiplexing.

Control packets on the ExRC and ExCC busses are issued with the corresponding Row Request and Column Request packets and are used to select the Expansion Buffer that supports the targeted Direct Rambus Channel. The ExRC and ExCC are used by the ExBuf to decode a Channel ID and route incoming request packets appropriately. Each memory channel 140 has its own Channel ID. For embodiments employing Direct Rambus Channels, the underlying request packets should have the same format as the Direct Rambus Channel request packets so that there is no command or address translation involved. To minimize latency, in one embodiment the Channel ID is packed into two clocks, as described later.

Expansion control packets should provide support operations and the requisite control channel bandwidth for maintaining the possibly many Direct Rambus Channels in a Memory Expansion Channel system. For example, in one embodiment the Memory Expansion Channel provides a channel refresh command that can be overlaid on memory access requests without reducing memory bandwidth.

For example, assuming a channel refresh rate of 1 μsec, a 32 channel system would require a refresh command every 30 ns. This would consume 33% of the channel bandwidth. Even in a 4 channel system the refresh overhead can be significant. With a 1 μsec refresh rate, refresh commands would consume 4% of the channel bandwidth. Hence the need for additional control bandwidth.

In addition to refresh, the expansion control packets should provide commands for memory channel Nap exit, Nap entry, and current control. Control channel bandwidth should be allocated to these commands so that memory accesses are not impacted.

Table 2 describes Expansion Bus Memory Request Signals used to transmit expansion request signals. For each signal in Table 2 there is a corresponding signal on the Direct Rambus Channel.

TABLE 2

Expansion Bus Memory Request Signals.

| Signal | Description |
| --- | --- |
| ExRRq[2:0] | Expansion Row Request. These signals carry row request packets from the memory controller to the ExBufs. These correspond to the RRq[2:0] signals on the Direct Rambus Channel. |
| ExCRq[4:0] | Expansion Column Request. These signals carry column request packets from the memory controller to the ExBufs. These correspond to the CRq[2:0] signals on the Direct Rambus Channel. |
| ExSIO | Expansion Serial IO Chain. Serial input/output pins used for reading and writing control registers. These correspond to the SIO signals on the Direct Rambus Channel. |
| ExSCK | Expansion Serial Clock. Clock source used to used for timing of the ExSIO and ExCMD signals. This corresponds to the SCK signal on the Direct Rambus Channel. |
| ExCMD | Expansion Serial Command. Serial command input used for control register read and write operations. This corresponds to the CMD signal on the Direct Rambus Channel. |
| ExDQA[8:0] | Expansion Data Bus, Data Byte A. Bi-directional 9 bit data bus A. These correspond to the DQA[8:0] signals on the Direct Rambus Channel. |
| ExDQB[8:0) | Expansion Data Bus, Data Byte B. Bi-directional 9 bit data bus B. These correspond to the DQB[8:0] signals on the Direct Rambus Channel. |
| ExCTM, ExCTMN | Expansion Clock To Master. Differential clock driven from the clock source to the memory controller. |
| ExCFM, ExCFMN | Expansion Clock From Master. Differential clock driven from the memory controller to the end of the expansion channel. |

It will be clear to one of ordinary skill in the art that many other signals may be needed for practical implementation. For example, the ExBuf must also have a Vref input and power and ground connections for the core, I/O interface, and clock circuits.

Two packet formats are provided, one for routing row request packets and for issuing refresh and power mode commands, and one for routing column request packets and for issuing current calibration commands.

The Expansion Row Control bus carries Expansion Row Control Packets (ExRCP), with an embodiment shown in FIG. 3. Referring to FIG. 3, a particular embodiment of a ExRCP is 4 clocks long. An ExRCP on ExRC[0] is divided into three parts. The first part contains a framing (start) bit and the ID of the memory channel to receive any corresponding ExRRq packet. The second part contains a bit (G) that indicates whether a secondary packet needs to be generated and the secondary channel ID. The last part contains the secondary opcode, rop[1:0].

Packets on ExRC[1] are used only for additional channel ID bits. For a system that needs to support up to 4 ExBufs, only ExRC[0] is needed. Table 3 describes the fields for the packet formats of FIG. 3.

TABLE 3

ExRCP Field Definitions.

| Field Name | Description |
|---|---|
| S | Start. Used to frame the ExRCP. Note, it is illegal to issue an ExRRq packet without a corresponding ExRCP. |
| C[4:0] | Channel ID. Selects the channel to receive the next ExRRq. |
| G | Generate. Indicates whether to generate a secondary packet on the channel specified by SC[4:0] |
| rop[2:0] | ExRCP Secondary Opcode. This operation is directed toward the channel specified by SC[4:0]. |
| SC[4:0] | Secondary Channel ID. Selects the channel to receive the secondary operation. |
| res | Reserved. |

Note that for a given implementation, the Channel ID can be divided into the Expansion Buffer ID and the Expansion Buffer Channel ID. For example, if there are 2 Direct RDRAM Channels per Expansion Buffer and 32 Expansion buffers then C[5:1] selects the ExBuf and C[0] selects one of two channels behind that buffer.

Table 4 lists the encoded functions of the rop[2:0] field of the ExRCP. Tables 3 and 4 are exemplary embodiments, and some of the fields in these tables are optional.

TABLE 4

ExRCP Command (rop) Encoding.

| G | rop[1:0] | Function |
|---|---|---|
| 0 | 00 | No rop. No secondary operation is being issued. The ExRCP is only being used to route a request packet to the channel selected by C[4:0]. |
| 0 | 01 | Powerdown Exit. Causes a broadcast powerdown exit command to be issued on the channel selected by SC[4:0]. This will utilize the CMOS control protocol on the memory channel to accomplish, the powerdown exit. |
| 0 | 10 | Nap Exit. Causes a broadcast nap exit command to be issued on the channel selected by SC[4:0]. This will utilize the CMOS control protocol on the memory channel to accomplish the nap exit. |
| 0 | 11 | DLL Refresh. Causes a broadcast DLL refresh command to be issued to all devices in Nap on the channel selected by SC[4:0]. |
| 1 | 00 | Nap Entry. Causes a broadcast nap entry command to be issued on the channel selected by SC[4:0]. |
| 1 | 01 | Precharge Before/After Refresh. Causes a broadcast precharge command to be issued on the channel selected by SC[4:0]. The bank address is provided by the ExBuf. When this is issued after a refresh it caused the bank address in the ExBuf to be incremented. |
| 1 | 10 | Refresh. Causes a broadcast refresh to be issued on the channel selected by SC[4:0]. The bank address is provided by the ExBuf. |
| 1 | 11 | Reserved. |

For the Powerdown Exit, Nap Exit, and DLL Refresh commands it should be the responsibility of the ExBuf to time the events associated with the operations. The memory controller should time the total operation. For the Nap Entry, Precharge, and Refresh commands the memory controller should time the total operation, but there are no events that require timing in the ExBuf.

The Expansion Column Control bus carries Expansion Column Control Packets (ExCCP) with a format shown in FIG. 4. As with the ExRCP, a ExCCP on ExCC[0] is divided into three parts. The first part contains the encoded framing bit and the primary channel ID. The second part has a bit, R, that is used to indicate when an XOP or byte mask needs to be redirected. This part also contains the secondary channel ID. The last part contains the secondary opcode. ExCC[1] is used only for additional channel ID bits. This allows a system that needs to support up to 4 ExBufs to use only ExCC[0]. Table 5 provides descriptions of each of the fields of the ExCCP packet. This is only an exemplary embodiment, and some of the fields in Table 5 are optional.

TABLE 5

ExCCP Field Definitions.

| Field Name | Description |
|---|---|
| C0T, C0F | Start. Encoded framing bit for the ExCCP.<br>00 - No start bit. No framing.<br>01 - Frame packet, C[0] = 0.<br>10 - Frame packet, C[0] = 1.<br>11 - Frame packet, no ExCRq, Expansion Channel Current Calibrate.<br>Note, it is illegal to issue an ExCRq packet without a corresponding ExCCP. |
| C[4:1] | Channel ID. Selects the channel to receive the next ExCRq. |
| R | Redirect XOP/Byte Mask. Causes the XOP/Byte Mask field of the corresponding request packet to be forwarded to the channel selected by SC[4:0]. The channel selected by C[4:0] does not forward the XOP/Byte Mask field. |
| Cop[1:0] | ExCCP Secondary Op-code. The indicated operation is performed on the channel selected by SC[4:0]. See Table 6: ExCCP Secondary Command (cop) Encoding. For the encoding of this field. |
| SC[4:0] | Secondary Channel ID. Selects the channel to receive the secondary operation. |
| res | Reserved. |

Table 6 lists the encoded functions of the cop[1:0] field of the ExCCP.

TABLE 6

ExCCP Secondary Command (cop) Encoding.

| cop[1:0] | Function |
|---|---|
| 00 | No cop. No secondary operation is being issued. The ExRCP is only being used route a request packet to the channel selected by C[4:0]. If C0T, C0F = 11 there is no corresponding request packet and the ExRCP is a no-op. |
| 01 | Current Calibrate. Calibrate the current on the channel specified by SC[4:0]. The necessary DevID is provided by the ExBuf. Expansion Current Calibrate. If C0T, C0F = 11 calibrate the current on the expansion channel for the ExBuf specified by the high order bits of SC[4:0]. A mask register in the ExBuf identifies which bits of SC[4:0] are ExBuf selection bits. |
| 10 | Reserved. |
| 11 | Current Calibrate and Sample. Calibrate and sample the current on the channel specified by SC[4:0]. The necessary DevID is provided by the ExBuf and is incremented after this command is executed. Expansion Current Calibrate and Sample. If C0T, C0F = 11 calibrate and sample the current on the expansion for the ExBuf specified by the high order bits of SC[4:0]. A mask register in the ExBuf identifies which bits of SC[4:0] are ExBuf selection bits. |

There are three timing parameters that define the relationships between packets used to transfer data to and from memory on the Memory Expansion Channel. These are listed in Table 7.

TABLE 7

Expansion Bus Timing Parameters.

| Parameter | Description | Min. (clocks) |
|---|---|---|
| $t_{XCRD}$ | Expansion Control Packet to Request Packet Delay. | 0 |
| $t_{XRRD}$ | Expansion Request Packet to Direct RDRAM Request Packet Delay. | 4 |
| $t_{XDDD}$ | Expansion Data to/from Direct RDRAM Data Delay. | 2 |

The minimum values shown in Table 7 represent specific embodiments, and serve only as examples. With $t_{XCRD}$=0 the memory controller issues the control and request packets at the same time. A non-zero value for this parameter would allow for a memory controller design that either computed the values for the control packet before those for the request packet or that needed to introduce a delay between the control and request packets.

The minimum request delay through the ExBuf, $t_{XRRD}$=4, represents 2 clocks to transmit the control packet to the ExBuf, 1 clock to decode the channel ID and 1 clock to route the packet. Clock cycles can be added as needed if the decode or routing cannot be done in 1 clock. It may also be necessary to add clocks for synchronization across timing domains.

For simplicity of discussion only, we assume that the memory devices are Direct RDRAMs in the embodiments and timing diagrams which follow, and we assume the minimum delays as given in Table 7. FIG. 5 provides a legend of the symbols used, and in the following embodiments, the data packets are 4 clocks and carry 16 bytes. For the following timing diagrams, we assume a 400 MHz clock, so that the packets are 10 ns. On the Direct RDRAM Channel, the high speed clock is referred to as RClk. The following set of timing diagrams to be described shortly show the behavior of an exemplary Memory Expansion Channel for memory read operations. The diagrams show the timing for read page hit, page empty, and page miss accesses for an idle memory system. All diagrams show a 10 ns delay from the expansion control packet to the request packet on the Direct RDRAM Channel, and they show a 5 ns delay for the data to transfer from the Direct RDRAM Channel to the expansion data channel.

FIG. 6 shows the timing of a page hit access for a 32 byte read. The clock shown is the high speed channel clock, which we assumed to be 400 MHz, and at this frequency the timing grid has a tick each 5 ns. In FIG. 6, the first Expansion Column Control Packet ExCCP is issued in clock 0. The second ExCCP is issued in clock 4. The first column request packet, CRq, is issued on the selected Direct RDRAM Channel in clock 4 and in clock 16 the selected Direct RDRAM begins to drive the first 16 byte data packet onto the Direct RDRAM Channel. In clock 18 this data begins to appear on the Expansion Bus. By clock 20 the first 8 bytes of data has been clocked into the memory controller. This gives a page hit idle latency on the expansion channel of 20 clocks, or 50 ns at 400 MHz.

FIG. 7 shows the timing of a page empty read access. This type of access begins with the issue of an Expansion Row Control packet ExRCP in clock 0 along with a request to activate a row. The activate request is issued on the selected Direct RDRAM Channel in clock 4. After a row-to-column delay a sequence of column control and request packets is issued to access the activated row. This delay is 9 clocks, and corresponds to a DRAM core RCD delay of 25 ns. Beginning with column packets in clock 9, the timing is the same as the page hit shown in FIG. 6. The page empty idle latency on the expansion channel is 29 clocks, or 72.5 ns at 400 MHz.

FIG. 8 shows the timing of a page miss read access. In this case the currently active row must be precharged back to the DRAM core so that a new row can be activated. This access begins in clock 0 with the issue of an ExRCP and a corresponding request to precharge a specified row. This precharge command appears on the selected Direct RDRAM Channel in clock 4. After a precharge delay of 8 clocks the sequence of packets for a page empty access begins. This delay corresponds to a DRAM core RP delay of 20 ns. The page miss idle latency on the expansion channel is 37 clocks, or 92.5 ns at 400 MHz.

The next following set of timing diagrams show the behavior of the Memory Expansion Channel for memory write operations. The diagrams show the timing for write page hit, page empty, and page miss accesses for an idle memory system. All diagrams show a 10 ns delay from the expansion control packet to the request packet on the Direct RDRAM Channel, and they show a 5 ns delay for the data to transfer from the expansion data channel to the Direct RDRAM Channel.

FIG. 9 shows the timing of a page hit access for a 32 byte write. The write page hit access begins in clock 0 with an Expansion Column Control packet ExCCP, and a corresponding column request packet. The column request packet is issued on the selected Direct RDRAM Channel in clock 4. The corresponding write data is issued on the Expansion Bus beginning in clock 12, for a write offset of 8 on the Memory Expansion Channel. This results in a write offset of 6 on the Direct RDRAM Channel. A second sequence of column packets begins on the Memory Expansion Control bus in clock 4. In clock 8 a third ExCC packet is issued with a corresponding NOP request. This NOP request is issued on the Direct RDRAM Channel in clock 12 to retire the first 16 byte write to the DRAM core. A second NOP sequence follows this to retire the second 16 bytes of data to the core.

FIG. 10 shows the timing of a page empty write. This access begins in clock 0 with an ExRCP and a corresponding activate request. The activate request is issued on the selected Direct RDRAM Channel in clock 4. After a row-to-column delay of 9 clocks a sequence of column control and request packets is issued to access the activated row. Beginning in clock 9 the timing is the same as the page hit access shown in FIG. 9.

FIG. 11 shows the timing of a write page access miss. As with the read miss the currently active row must be precharged back to the DRAM core so that a new row can be activated. This access begins in clock 0 with the issue of an ExRCP and a corresponding request to precharge a specified row. This precharge command appears on the selected Direct RDRAM Channel in clock 4. After an 8 clock precharge delay the sequence of packets for a page empty access begins.

FIG. 12 shows a sequence of three reads, a page empty read followed by a page hit followed by a page miss. All three of these accesses are 32 bytes. Because of the pipelining of control packets on the Memory Expansion Channel bus, the pipeline delays for read accesses are the same on the expansion data bus as they are on the Direct RDRAM data bus. For page empty and page hit access the pipeline delay is 0 clocks. For page miss reads the pipeline delay is 24 clocks (for 32 byte accesses at 400 MHz).

FIG. 13 shows the same sequence for writes, i.e. page empty write, page hit write, and page miss write. All are 32 byte accesses. As with reads, the pipeline delays on the Expansion Bus are the same as those on the Direct RDRAM data bus.

We now describe exemplary embodiments utilizing various pipelined operations of memory reads and writes on the Memory Expansion Channel. Timing diagrams are shown for the following combinations of reads and writes:

1. read—write—read all to the same device, all page empty access (e.g., read from (CID[ci], DevID[di]), write to (CID[ci], DevID[di]), read from (CID[ci], DevID[di]));
2. read—write to the same device, read to same channel different device, all page empty access (e.g., read from (CID[ci], DevID[di]), write to (CID[ci], DevID[di]), read from (CID[ci], DevID[dj])); and
3. read—write to the same device, read to a different channel, all page empty access (e.g., read from (CID [ci], DevID[di]), write to (CID[ci], DevID[di]), read from (CID[cj], DevID[dj]));

where DevID refers to device ID and CID refers to channel ID, which will be described in more detail later.

The next four timing diagrams illustrate the pipelined behavior for sequences of read-write-read for the cases described above. FIG. 14 shows the case of a read-write-read, all page empty 32 byte accesses to the same device on the same Direct RDRAM Channel. On the Expansion Bus, the read-write pipeline delay is 0 clocks and the write-read delay is 14 clocks. For a stand-alone Direct RDRAM Channel the read-write delay is 0 clocks and the write-read delay is 10 clocks. For the Direct RDRAM Channel behind an ExBuf the read-write delay increases to 4 clocks while the write-read delay remains 10 clocks. This clock increase is due to the 2 clock delay through the ExBuf in each direction. With multiple levels of ExBuf the read-write delay will remain 0 clocks and the write-read delay will increase by 4 clocks for each level of ExBuf.

FIG. 15 shows the same sequence except that the second read is directed to a different device on the same Direct RDRAM Channel. In this case the write-read pipeline delay on the Memory Expansion Channel bus is 6 clocks. This is the 2 clocks on the Direct RDRAM data bus plus 2 clocks in each direction through the expansion buffer.

The next two timing diagrams illustrate the case of a read-write to the same device followed by a read to a different device on a different Direct RDRAM Channel. FIG. 16 shows the timing if the memory controller issues the NOPs needed to retire the writes. This is referred to as explicit retire. FIG. 17 shows the timing if the ExBuf issues the NOPs on its own using an auto-retire mechanism.

In FIG. 16 the column control packets and NOPs issued on the Memory Expansion Channel bus beginning in cycle 30 push the following read request out by 8 clocks. This results in a write-read pipeline delay of 14 clocks on the Expansion Bus.

FIG. 17 shows that with auto-retire the second read can begin 8 clocks sooner. This reduces the write-read delay on the Memory Expansion Channel bus to 6 clocks. This is the same delay as switching devices within the same Direct RDRAM Channel.

In a memory system with multiple levels of Expansion Buffers, pipelined operation proceeds much as described above. However, latencies and pipeline bubbles grow. With each additional level the latency for any given access type grows by 6 clocks. The read-write bubble remains at zero at the memory controller, however, the write-read bubble grows by 4 clocks for each level of Expansion Buffers.

As an example of operations in a multilevel system, FIG. 18 shows a 32 byte page empty read in a system with two levels of Expansion Buffers. At clock 0 an ExRCP and corresponding ExRRq are issued from the memory controller. The first level of ExBuf routes this to channel 0 of the next level of the Memory Expansion Channel bus. The packets are issued at this level in clock 4 on ExRC(0) and ExRRq(0). A request packet is issued on an Direct RDRAM Channel in clock 8. Read data is returned from the addressed Direct RDRAM starting in clock 29, and on the top level expansion bus in clock 33, i.e. data takes 2 clocks per level of ExBuf.

FIG. 19 shows another example of pipelined operation in a system with two levels of Expansion Buffers. The sequence illustrated is a read followed by a write to the same device which is then followed by a read to a different Direct RDRAM Channel. This shows that the write-read bubble increases by 4 clocks as compared to the same case in a 1-level system (see FIG. 17).

We now describe auxiliary operations, beginning with Redirection. In a sequence of memory access request packets that switches between Direct RDRAM Channels connected to a Memory Expansion Channel, it is possible that a column request packet targeting a channel contains an XOP or byte mask that needs to go to a different Direct RDRAM Channel. For example, suppose the memory controller wants to read from device 12 on one Direct RDRAM Channel and in the same command wants to XOP precharge device 0 on a different channel. On a stand-alone Direct RDRAM Channel this operation is part of the protocol, but when device 12 and 0 are on different Direct RDRAM Channels the Direct RDRAM protocol is not sufficient.

Embodiments of the Memory Expansion Channel include a mechanism, which we refer to as redirection, that handles this case. The operation is illustrated in FIG. 20. In cycle 17 a column request packet targeting Direct RDRAM Channel 1 is issued. This packet also contains an XOP that is intended to target a device on Direct RDRAM Channel 0. To make this redirection happen the memory controller adds a redirection command to the corresponding ExCCP with the channel ID of the channel to receive the XOP. The ExBuf to which channel 0 is connected generates a NOP request packet with the redirected XOP attached. The ExBuf to which channel 1 is connected removes the XOP from the original column request packet before it is sent to channel 1. Redirection of byte masks is handled in a similar manner.

An embodiment of the Memory Expansion Channel architecture provides for the issue of broadcast precharge operations to a specified Direct RDRAM Channel that can be carried out concurrent with memory accesses. This operation is used to close a specified bank in all devices before and after a refresh operation. The targeted ExBuf must provide the bank address. FIG. 21 shows the broadcast precharge operation concurrent with a sequence of page empty read accesses.

An embodiment of the Memory Expansion Channel architecture provides for the issue of broadcast refresh operations to a specified Direct RDRAM Channel that can be carried out concurrently with memory accesses. This operation is used in conjunction with the broadcast precharge operation described previously.

FIG. 22 shows an entire refresh sequence. In clock 0 a broadcast precharge is issued to channel 1. This is followed in cycle 8 by a broadcast refresh. In cycle 40 a second broadcast precharge is issued to close the pages opened by the refresh command. The ExBuf detects the precharge after refresh and increments its internal bank counter. All of the operations involved in this refresh sequence can be carried out concurrently with read accesses.

Embodiments of the Memory Expansion Channel provides control mechanisms that allow memory channels to be placed in Nap or to be activated. These Nap-entry and Nap-exit operations can be carried out concurrently with read accesses. The Nap-entry sequence is illustrated in FIG. 23. In clock 8 the ExRC packet is augmented with a secondary Nap entry command targeting channel 1. The ExBuf to which channel 1 is attached issues a broadcast Nap-entry on channel 1 in clock 12.

FIG. 24 shows a Nap-exit sequence. In this case the ExRC issued in clock 8 is augmented with a secondary command to Nap-exit channel 1. The ExBuf controlling channel 1 uses the Direct RDRAM CMOS control bus and the channel 1 data bus to perform the Nap-exit. Since a Nap exit takes several clocks, in an exemplary embodiment the memory controller should not access channel 1 until the Nap-exit process is complete.

An embodiment of the Memory Expansion Channel architecture also provides a control mechanism that allows a channel to be activated from the power-down state concurrently with memory accesses. This will be useful when a system is being powered up. The first channel to be accessed will be powered up using a Direct RDRAM request packet. The expansion mechanism allows additional channels to be powered up concurrently with accesses to already powered channels.

For embodiments of the Memory Expansion Channel comprising Direct RDRAM Channels, the Direct RDRAM Channels need to have their data bus current calibrated approximately every 100 ms. This process requires that accesses on a channel be halted and that a sequence of column request packets be issued to calibrate and sample the current. Typically 4 column request packets must be issued. In a system with a large number of Direct RDRAM Channels, this process may be too time consuming to be performed with ExCRq packets. Embodiments of the Memory Expansion Channel architecture allow these current calibration operations to be carried out concurrently with memory accesses to other channels. FIG. 25 illustrates this process. As shown, the ExCC packets issued beginning in clock 16 are augmented with current control secondary commands that target channel 1. The memory accesses are being carried out on channel 0. The ExBuf to which channel 1 is connected interprets these secondary commands and issues the required current control commands on channel 1.

Current calibration on the Memory Expansion Channel bus is carried out by halting all memory operations and issuing current control packets on the ExCC bus. The timing and operation of these packets is the same as the corresponding packets on an Direct RDRAM Channel.

The CMOS protocol on the Direct Rambus Channel is used for initialization, register reads and writes and power mode control. In an embodiment of the Memory Expansion Channel, a CMOS protocol is used only for initialization, register reads and writes and power management in the ExBuf. It is not used for power management of the Direct RDRAM devices. Power mode control of these devices is accomplished by issuing packets on the Memory Channel Expansion Control Bus.

Embodiments of the Memory Expansion Channel employing Direct RDRAM Channels use the same set of CMOS signals as the Direct RDRAM Channel. The connection of these signals is illustrated in FIG. 26. Embodiments of the Memory Expansion Channel use an augmented CMOS control packet format, which is a superset of the packet format used with Direct RDRAM devices. The protocol allows packets to be directed to individual ExBufs, broadcast to all ExBufs, or forwarded to selected Direct RDRAM Channels.

The CMOS signals used in an embodiment of the Memory Expansion Channel, as shown in FIG. 26, are described in Table 8. As shown in FIG. 26, ExSIO is daisy-chained from ExBuf to ExBuf. ExSCK and ExCMD are bussed to the ExBufs.

TABLE 8

Expansion Bus CMOS Signals.

| Signal | Description |
| --- | --- |
| ExSIO | Expansion Serial SIO Chain. These correspond to the SIO signals on the Direct Rambus Channel. |
| ExSCK | Expansion Serial Clock. This corresponds to the SCK signal on the Direct Rambus Channel. |
| ExCMD | Expansion Serial Command. This corresponds to the CMD signal on the Direct Rambus Channel. |

Embodiments of the Memory Expansion Channel employing Direct RDRAM Channels may provide for serial control packets that are a superset of those used on the Direct RDRAM Channel. These packets may be directed to a specified ExBuf, broadcast to all ExBufs, forwarded to a specified Direct RDRAM Channel, or broadcast to all Direct RDRAM Channels. Four types of packets are defined:

1. Expansion serial request packets, ExSRQ.
2. Expansion serial address, ExSA.
3. Expansion serial interval, ExSINT.
4. Expansion serial data, ExSD.

FIG. 27 shows the layout of each of these packet types. Note that these packet formats are the same as those used by the Direct RDRAM devices. Table 9 describes each of the fields for these serial packets. We now describe in more detail packet format embodiments and the operations that can be performed on the serial control bus.

TABLE 9

Expansion Bus Serial Packet Field Definitions.

| Field | Description |
| --- | --- |
| xSOP[3:0] | Expansion Serial Op-code. Specifies command for control register operations. Encodings not listed are reserved. 0000 - xSRD, Serial read of control register xSA[11:0] in ExBuf xC[4:0]. 0001 - xSWR, Serial write of control register xSA[11:0] in ExBuf xC[4:0]. 0010 - xSETR, Set reset bit in ExBuf xC[4:0], all control registers assume their reset value and all internal logic enters the reset state. 0011 - xCLRR, Clear reset bit in ExBuf xC[4:0], all control registers retain their reset value and all internal logic begins operation. A serial chain reset is issued to channels connected to the selected ExBuf. 0100 - xRSRD, Route the attached SRD transaction to the Direct RDRAM Channel xC[4:0]. 0101 - xRSWR, Route the attached SWR transaction |

TABLE 9-continued

Expansion Bus Serial Packet Field Definitions.

| Field | Description |
|---|---|
| | to the Direct RDRAM Channel xC[4:0]. |
| | 0110 - xRRST, Route the attached reset packet to the Direct RDRAM Channel xC[4:0]. |
| xSBC | Expansion Serial Broadcast. |
| xC[4:0] | Expansion Buffer Serial Address. Compared to the xSCID[4:0] field of the XINIT control register to select the ExBuf to which the expansion serial transaction is directed. Compared to the xSCID[4:0] field of the xINIT control register to select the Direct RDRAM Channel to which the associated serial transaction is directed. |
| xSRA[11:0] | Expansion Serial Register Address. Selects which control register of the selected ExBuf is read or written. |
| xSD[15:0] | Expansion Serial Data. The 16 bits of data read from or written to the selected control register in the selected ExBuf. |

After power-on the ExBufs and all of the Direct RDRAMs in the memory system must be reset. This process uses the following steps:
1. Reset the ExSIO chain that connects the ExBufs together.
2. Reset the ExBufs using serial control packets. (It's optional to provide a reset pin on the ExBuf, in which case steps (1) and (2) are not needed.) At this point a register read can be issued to determine if the devices connected are ExBufs or Direct RDRAMs.
3. Broadcast reset the SIO chains of all Direct RDRAM Channels.
4. Broadcast reset all Direct RDRAMs.

The details of each of these steps will now be described. First, the ExSIO serial chain is reset by issuing a 1 to 0 transition on the ExCMD signal. The required sequence is shown in FIG. 28. ExCMD is sampled on both the rising and falling edge of ExSIO. A 1100 sequence on ExCMD resets the state machine controlling the ExSIO pins in each ExBuf. After this reset the ExSIO pins are both set to input. The memory controller drives a "1" on its ExSout pin. All ExBufs observe "0" on their ExSIO pins except for the first ExBuf in the chain, which observes the "1" driven by the memory controller on its ExSIO pin. The first ExBuf configures the "1" pin as ExSin and the "0" pin as ExSout. This forwards the "1" to the next ExBuf in the chain. This process continues until all of the ExBufs on the chain have there ExSIO pins configured.

Next, the internal logic of the ExBufs must be reset. This is accomplished by issuing a sequence of command packets on the expansion CMOS signals. This sequence is shown in FIG. 29. First, the xSETR command is broadcast to all ExBufs. This sets the reset bit in all ExBufs. Then the xCLRR command is broadcast to all ExBufs to clear the reset bit. At this point the logic in all ExBufs begins operation. An SIO reset sequence is issued at this time to all channels connected to the ExBufs. This is illustrated in FIG. 29 for channel [i] with 32 devices.

A read of the MVER register can be performed to determine if the connected device is an ExBuf or an Direct RDRAM. An ExBuf will return MVER[15]="1", an Direct RDRAM will return MVER[15]="0". In a system with multiple levels of ExBufs, the first two steps must be repeated until the Direct RDRAM devices have there SIO chains reset (step 3) by the xSETR, xCLRR sequence directed to the last level of ExBufs. At this point the Direct RDRAM devices must be reset. This is accomplished by broadcasting a broadcast SETR, CLRR sequence to all Direct RDRAMs in the system. This is shown in FIG. 30.

The following steps are performed to initialize the memory. subsystem after reset.

1. Assign unique serial addresses to all ExBufs.
2. Read all read-only registers and process the information.
3. Update the necessary read-write registers.
4. Assign unique device IDs to each Direct RDRAM and channel IDs to each ExBuf.
5. Repeat steps 1 to 3 for all levels of ExBuf and for all Direct RDRAM Channels.
6. Levelize the expansion channel(s).
7. Levelize all Direct RDRAM Channels.

Note that before step 4 is executed all ExBufs and Direct RDRAMs have a channel/device ID of zero. At this time it is possible to clear memory and set valid ECC (error correction codes) in all locations by issuing writes to each location with the Direct RDRAMs. Since all channel and device IDs are zero, all ExBufs will route these writes to all output channels and all Direct RDRAMs will accept these writes and update their DRAM cores.

FIGS. 31 and 32 are timing diagrams for serial read and write operations for control registers within an Expansion Buffer, and FIGS. 33 and 34 are timing diagrams for serial read and write operations from the Expansion bus for control registers in Direct RDRAM devices.

As indicated in FIG. 1 or 2, the Expansion Buffer serves as a bridge between the Expansion Bus and some number of memory channels, which in FIG. 2 are Direct RDRAM Channels. In a memory system with multiple levels of Expansion Busses the ExBuf acts as an ExBus-to-ExBus bridge. In either case, the ExBufs primary responsibility is to decode control packets on the Expansion Bus and to route these request packets, as directed, to the designated memory channel or Direct RDRAM Channel. Other operations performed by the ExBuf include:

1. Auto-retire of writes held in Direct RDRAM write buffers.
2. Refresh and precharge of specified Direct RDRAM Channels.
3. Power Management of Direct RDRAM Channels as directed by the memory controller.
4. Redirection of XOPs and Byte Masks.
5. Current calibration of the Direct RDRAM data busses and of the expansion data bus.

In one embodiment, the internal architecture of the Expansion Buffer is composed of the following blocks:

1. Channel ID Decode. This block decodes the channel IDs in control packets and feeds the results into the request control blocks.
2. Memory control and request path. Memory requests, either received from the expansion bus or generated internally are routed to there destinations on the memory request path. The control path interprets control packets on the ExRC and ExCC busses and, based on the results, routes request packets to the appropriate output channel and/or modifies or generates request packets in response to secondary commands.
3. Redirection. Detects the cases that require redirection of XOP or byte mask and modify/generate packets as needed.
4. Auto-retire. Monitors writes and determines when it is necessary to generate an auto-retire sequence on an Direct RDRAM Channel.

5. Precharge/Refresh. Generates precharge and refresh packets as directed by the ExRC packets.
6. Power Mode Control. Generates power mode control packets on the selected Direct RDRAM request bus or CMOS control bus.
7. Current Calibration. For Direct RDRAM Channel calibration, generates current calibration packets on the selected Direct RDRAM CRq bus. For expansion channel calibration, controls local calibration circuits.
8. Memory data path. Memory read and write data moves through the ExBuf on this path.
9. Serial ID Decode and Serial Control. Decodes the IDs in serial control packets and interprets CMOS control packets. Based on the results it either generates operations. local to the targeted ExBuf or routes serial control packets on an Direct RDRAM Channel.
10. Power management control. Manages the power domains and clock domains within the ExBuf.

These blocks are now described in more detail.

A memory channel is selected by specifying a 5 bit channel ID, or CID. In the case of a memory system with a single level of ExBufs this ID can be viewed as being composed of two fields, the ExBuf ID and the memory channel associated with the ExBuf. For example, suppose there are two ExBufs on the expansion channel and each ExBuf supports two Direct RDRAM Channels. CID[0] then selects the Direct RDRAM Channel with the ExBuf and CID[1] selects between the two ExBufs. A mask register, the BMSK, is provided in the ExBuf to select the bits that correspond to the ExBuf ID. In this example the BMSK will be $00010_2$. The channel mask, CMSK, will be $00001_2$.

In a memory system with multiple levels of ExBuf the channel ID can be viewed as having additional fields for selecting an expansion buffer at that level and selecting the channel within those ExBufs.

As another example of an embodiment, consider the multilevel system shown in FIG. 35. Each base level ExBuf supports two Direct RDRAM Channels, and there are 2 ExBufs per base expansion bus. Therefore the BMSK in these devices will be $00010_2$ and the CMSK will be $00001_2$. At the next level there are two ExBufs each supporting 2 expansion busses. The masks at this level are BMSK=$01000_2$ and CMSK=$00100_2$. Note that in the case that there is only one ExBuf at a level the BMSK will be all zeroes and the ExBuf must respond to all requests.

In an embodiment, there are two request paths in the ExBuf, the ExRRq path and the ExCRq. Each of these paths has a corresponding control path, the ExRC and ExCC paths, respectively. Control packets received on the control path are interpreted and the results are used to route request packets to the appropriate output channel or, to modify or generate request packets in response to secondary commands in the control packet.

FIG. 36 provides a block diagram of a control and request path pair. For the most part, the row and column versions of FIG. 36 are the same, and are obtained by simply replacing the "?" with an "R" or "C". As shown in FIG. 36, the control path consists of three clocked elements and a main control block. When the first three clocks of a control packet have been received the main control block has all of the information necessary to route incoming request packets and/or to generate secondary packets. These are referred to as G and P respectively in the diagram. In the case of row control, the packet generator produces refresh, precharge, and power mode control packets. For column control it generates current control packets.

The request path has three clocked elements that stage the incoming request path, a packet generator that provides secondary packets, and a 2-to-n router. This form of router is necessary because in some cases both a G and P packet must be routed (but never to the same output request path). The router is followed by the final clocked stage of the request path.

In the case of the column circuits two additional blocks are included, one is used to modify packets for XOP redirection, the other is used to detect writes. Timing should allow both of these blocks to be placed in the previous clock stage if needed.

Memory requests issued by the memory controller must be routed to a selected memory channel (or Direct RDRAM Channel for embodiments employing Direct RDRAM Channels). This is performed according to the following steps:

1. Detect start bit and frame packet.
2. Decode the primary channel ID and apply the ExBuf mask to determine if this ExBuf is the targeted of the primary request packet.
3. If the primary channel ID matches, apply the appropriate Psel signal to the router to route the incoming request to the selected output channel.

In an embodiment, if a request packet is sent to a memory channel (or Direct RDRAM Channel) and that packet contains an XOP or byte mask that is associated with a request that was sent to a different Direct RDRAM Channel, then the XOP or byte mask should be redirected to that channel. To invoke this operation the memory controller should set the R bit in the expansion channel control packet. The targeted ExBufs will detect this bit and take the appropriate actions as described below.

In some embodiments, redirection is only used for ExCRq packets and is performed according to the following steps:

1. Detect start bit and frame packet.
2. Decode the primary channel ID and apply the ExBuf mask to determine if this ExBuf is the targeted of the primary request packet.
3. Decode the secondary channel ID and apply the ExBuf mask to determine if this ExBuf is the targeted of the R bit and secondary opcode. Also, check the R bit.
4. If R is set and this ExBuf is selected by the primary channel ID, modify the incoming packet by removing the XOP. This packet is directed to the router on input P.
5. If R is set and this ExBuf is selected by the secondary channel ID, generate a packet that contains the redirected XOP. This packet is directed to the G input of the router.

Note that the target indicated by the primary and secondary channel ID may be the same ExBuf but can not be the same memory channel or Direct RDRAM Channel. If the request and XOP are to go to the same memory channel, then the R bit should not be set.

FIG. 37 shows the packet modifications required for redirection of an XOP. In this case the M bit is zero. The original packet is routed as is, except that the fields in the second and third clocks are zeroed out. These fields correspond to the XOP device ID, opcode, and bank address. The generated packet contains a start bit, a copy of the M bit from the original packet, and the XOP fields from the original packet.

Figure 38:
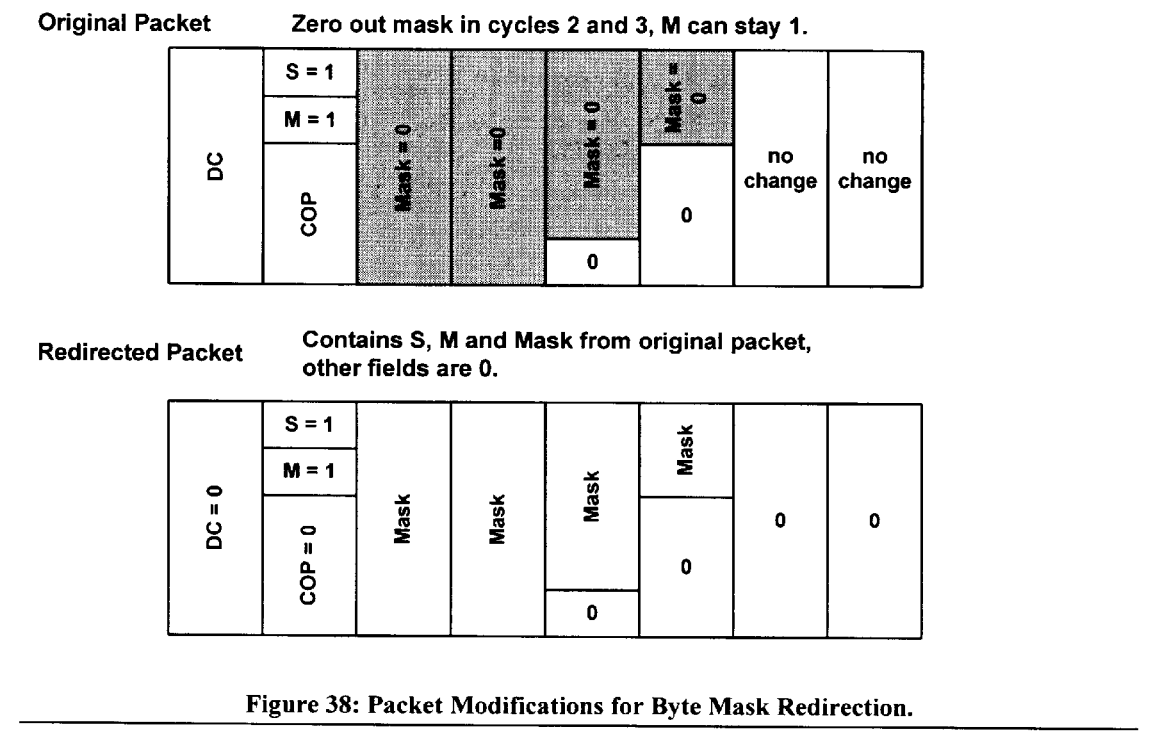

For an exemplary embodiment, FIG. 38 shows the packet modifications required for redirection of a byte mask. In this case the M bit is set. As with XOP redirection, the original packet is routed as is, except that the fields in the second and third clocks are zeroed out. These fields correspond to the byte mask. The generated packet contains a start bit, a copy of the M bit and the byte mask field from the original packet.

For each memory or Direct RDRAM Channel connected to an ExBuf, the ExBuf tracks the writes to that channel. If any writes are outstanding to that channel, i.e. they have not been retired to a DRAM core, and a memory access to a different Direct RDRAM Channel is detected, then it is the responsibility of the ExBuf to issue the appropriate number of NOP packets to retire the outstanding writes. This auto-retire operation is not intended to replace explicit retirement by the memory controller, but rather it is intended to allow the operation of the memory controller to be the same whether it connects directly to a memory channel (or Direct RDRAM Channel), or to an Expansion Bus. Specifically, within an Direct RDRAM Channel a pipelined read or write to a device retires previous writes to other devices. If a read or write is not pipelined after a write or if a read must be issued to the same device as the write, the memory controller issues the appropriate NOP packets to retire the writes. Auto-retire provides the same behavior in the context of the Memory Expansion Channel. That is, a pipelined read or write retires previous writes to other devices even if those devices are on a different channel (auto-retire). If a read or write is not pipelined after a write or if a read must be issued to the same device as the write, the memory controller issues the appropriate NOP packets to retire the writes.

In an embodiment, the structures used to accomplish auto-retire are shown in FIG. 39. These structures are replicated for each channel connected to the ExBuf. The Write Counter is used to count the number of writes outstanding to a channel. This counter can be incremented or decremented, and returns a zero indication to the control block. All counters are zeroed on reset. The counter maximum value is 2. The auto-retire control block receives two inputs from the main control block. The channel select signal indicates when this channel has been selected and the write request signal indicates when the current column request is a write. This control block performs the following operations:

1. If the channel is selected and the column request is a write, increment the write counter.
2. If the channel is selected and the column request is not a write, decrement the write counter.
3. If the channel is not selected and the write counter is not zero generate a NOP packet on the channel and decrement the write counter.
4. If the channel is selected and the write count is zero, frame an internal clock counter to the start of the current request. This counter is then used to count request slots in the case that the channel is not selected.

The structure of the NOP generated by the auto-retire logic is shown in FIG. 40. With the current definitions for COP and XOP, the packet is all zeros except for the start bit. This makes it very straightforward to generate.

Precharge and refresh operations are handled by the row control logic. When an ExRCP requests that a precharge or refresh packet is to be issued, a packet of the form shown in FIG. 41 is generated. In the first clock, the DR4T and DR4F bits are both set to indicate a broadcast operation. The bank bits from the ExBuf internal bank count for the targeted output channel are placed in the second cycle of the packet. The last two cycles of the packet contain the opcode which will be set to. indicate either a precharge or a refresh. It is the responsibility of the ExBuf to track the bank address for each output channel and to increment the bank count when a precharge is issued after a refresh. The bank incrementing pattern should be the same used by the Direct RDRAM.

The power mode control logic must handle the following operations: Nap entry; Nap exit; and Powerdown exit. Powerdown entry is accomplished with request packets directed to specified channels. To place all of the devices on a channel into the Nap state (Nap entry), the memory controller issues a Nap entry secondary command in an ExRCP. The ExBuf targeted by this command generates a row request packet on the selected channel. A format for this packet is shown in FIG. 42. In the first cycle the DR4T and DR4F bits are set to indicate a broadcast operation. The opcode in cycles 3 and 4 are then set to indicate a nap entry command.

To move all devices on a channel out of the Nap state (Nap exit), the memory controller issues a Nap exit secondary command in an ExRCP. The ExBuf targeted by this command issues a broadcast command on the data bus of the selected channel along with the appropriate transitions on the CMOS control signals for that channel. This initiates the Nap exit sequence in all of the devices on the selected channel. The memory controller should track the time required for this operation and not to issue any commands directed towards a channel in the midst of a nap exit. For a Memory Expansion Channel with Direct RDRAMs, Powerdown exit is handled in the same way as Nap exit except for the state of the SIO signal of the selected channel as specified by the Direct Rambus Specification.

Figure 43:
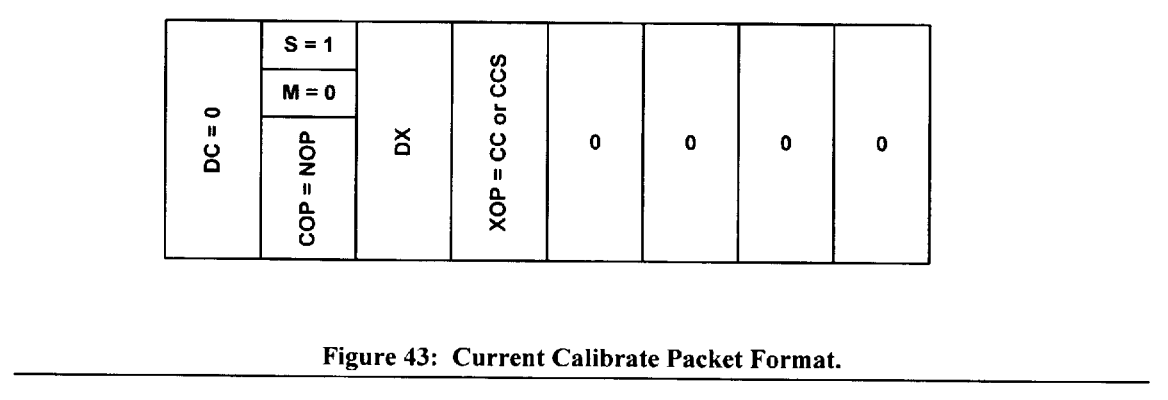

Current calibration of Direct RDRAM Channels is accomplished by issuing current calibrate secondary commands in ExCCP control packets. The ExBuf targeted by the current calibrate commands issues the appropriate column request packets on the output channel targeted by the ExCCP. The form of the generated packet is shown in FIG. 43. In the first cycle, the ExBuf sets the S bit. The device ID of the Direct RDRAM to receive the current calibrate command is placed in the DX field. This device ID is maintained in a register in the ExBuf. The XOP field is set to Current Calibrate or Current Calibrate and Sample as indicated in the cop field of the ExCCP. Note that the ExBuf does not receive the current calibrate command in the ExCCP until the 4 cycle. This means that the issue of the generated CRq packet will be delayed by 1 to 2 clocks. The memory controller tracks this delay. An ExRCP can issue with refresh commands that target Direct RDRAM Channels that are being calibrated.

If the C0T and C0F bits of the incoming ExCCP packet are both asserted and the cop field indicates a current control operation then the ExBuf targeted by the ExCCP must perform a current calibrate operation on the Expansion Bus. This operation is carried out in the same way as an Direct RDRAM Channel. For each calibrate command the ExBuf drives a calibrate packet onto the expansion data bus bits [5:3]. On a Sample command the ExBuf must sample the last calibration data packet and adjust its $I_{OL}$ current value. During current control on the Expansion Bus it is possible to issue ExRCP packets to Direct RDRAM Channels to perform refresh, precharge or power mode operations.

The data path within the ExBuf connects the Expansion data bus to the connected Direct RDRAM data busses. As shown in FIG. 44, read data passes directly through the ExBuf Since only one Direct RDRAM Channel drives read data at a time, the read paths can be OR'ed directly into the ExDQ read register.

Writes, however, should be steered to the selected output data channel and must be selected at the appropriate time, i.e. the clock cycles during which the write data is being asserted. This is handled by the Write Output Control block shown in FIG. 44. Each time a write column control packet is detected by the control path, a token containing the target channel is passed to the Write Output Control block and placed in a queue. This queue has an entry for each clock of data transferred, so the token is repeated 4 times in the queue. After a write offset time, specified in clocks and indicated by an internal register, the write path for the selected channel is enabled for each token in the queue. A token is popped from the queue for each clock of data transferred. For clocks in which no write data is transferred or write data is transferred to a different ExBuf, null tokens are placed in the queue. On null tokens, or when the queue is empty, all output paths are disabled. To support the broadcast of writes to all output channels during initialization of memory, the token should contain an unencoded channel select field. This allows the control path to select all channels to receive the write.

Decoding of a serial channel ID is handled in the. same way as main channel IDs. The same ID mask registers can be used. However, the same channel ID register can not be used for the serial and main channels. This allows the serial registers to be initialized without affecting the main channel ID which in turn allows the memory clear operation to be carried out.

When a serial packet arrives it is interpreted by a Serial Control block. If the operation indicated is an ExBuf register read or write, the targeted ExBuf accesses the selected register. If the operation indicates that the packet is to be routed the ExBuf selects the appropriate path and times the operation.

In embodiments of the Memory Expansion Channel with multiple levels of Expansion Buffers, it is necessary to differentiate between ExBufs that bridge between expansion busses and those that connect to memory Direct RDRAM Channels. Those that connect between expansion busses will be referred to as intermediate ExBufs, and those that connect to Direct RDRAMs will be referred to as base ExBufs.

Each ExBuf contains a register that indicates whether it is intermediate (=1) or base (=0). This register is set during initialization. Initialization is performed according to the following algorithm:

1. Initialize level count to 0 (in the memory controller).
2. Probe the serial channel at address 0000 with a register read of the register containing the manufacturer ID. This register contains a pattern that indicates ExBuf or Direct RDRAM.
3. If Direct RDRAM, done. Skip to step 6.
4. If ExBuf, increment the level count and configure R/W registers.
5. Repeat steps 2 to 4 routing the register read packets one level deeper each time.
6. Done, number of levels has been determined.

Once the number of levels has been determined it is possible to initialize all ExBufs and Direct RDRAMs.

Intermediate ExBufs should behave differently than base ExBufs, and thus there is a control register bit to select the appropriate mode of operation for each ExBus. If an ExBuf is intermediate it should pass through all command, request, and data packets unchanged. If it is a base ExBuf it should operate as described in previously.

The registers required to support the Memory Expansion Channel Architecture are divided into three groups: those required in each ExBuf, those required for each output channel of each ExBuf, and those required in the memory controller. These registers are summarized in Table 10, Table 11, and Table 12.

TABLE 10

Summary of ExBuf Registers.

| Name | Fields | Bits | R/W | Description |
|---|---|---|---|---|
| INIT | SxBID | [4:0] | R/W | Serial Expansion Buffer ID. |
|  | xML | [15] | R/W | Multilevel. |
| xBID | xBID | [4:0] | R/W | Expansion Buffer ID. |
|  | BMSK | [9:5] | R/W | Expansion Buffer ID Mask. Default = 11110. |
|  | CMSK | [14:10] | R/W | Expansion Channel ID Mask. Default = 00001. |
| CCA | xCCA | [6:0] | R/W | Expansion data bus current control A. |
|  | xASYM | [8:7] | R/W | Expansion asymmetry control. |
| CCB | xCCB | [6:0] | R/W | Expansion data bus current control B. |
| WO | WO | [4:0] | R/W | Write Offset. Default = 6 Clocks. |
| ExD | OBD | [3:0] | R | Expansion Buffer Outbound Delay. |
|  | IBD | [6:4] | R | Expansion Buffer Inbound Delay. |
| XP | XP | [3:0] | R | Expansion Channel Protocol Version. |
| MR | MR | [5:0] | R | Manufacturer. |
|  | EX | [15] | R | EX = 1 for Expansion Buffer, = 0 for Direct RDRAM. |
| ST | ST | [15:0] | R | Stepping. |

TABLE 11

Summary of per Output Channel ExBuf Registers.

| Name | Fields | Bits | R/W | Description |
|---|---|---|---|---|
| REFB | REFB | [4:0] | R/W | Refresh Bank Address. Default = 0. |
| CCDV | CCDV | [4:0] | R/W | Current Calibrate Device ID. Default = 0. |
| CCA | CCA | [6:0] | R/W | Current Control A. |
|  | ASYM | [8:7] | R/W | Asymmetry Control. |
| CCB | CCB | [6:0] | R/W | Current Control B. |
| NPX | NPX | [4:0] | R/W | DQ select, CMD framing for NAP/PD exit. |

TABLE 12

Memory Controller Registers for Expansion Channel Support.

| Name | Fields | Bits | R/W | Description |
|---|---|---|---|---|
| XDLY | XIBD | [3:0] | R/W | Inbound delay through an ExBuf. |
|  | XOBD | [7:4] | R/W | Outbound Delay through an ExBuf. |
| XLVL | XLVL | [1:0] | R/W | Number of levels of ExBufs in the memory system. |
| SRDD | SRDD | TBD | R/W | Serial read delay. |
| CCO | CCO |  |  | Current Control Offset. |

What is claimed is:

1. A memory system comprising:
   an expansion bus to propagate a control packet and a request packet;
   a first expansion buffer coupled to the expansion bus;
   a second expansion buffer coupled to the expansion bus;
   a first at least one memory channel coupled to the expansion buffer, each of the first at least one memory channel in one-to-one correspondence with a first set of channel identifiers; and a second at least one memory channel coupled to the second expansion buffer, each of the second at least one memory channel in one-to-one correspondence with a second set of channel identifiers;

wherein the first expansion buffer is coupled to the first at least one memory channel to route the request packet to a first memory channel belonging to the first at least one memory channel if the first memory channel's corresponding channel identifier matches a channel identifier stored in the control packet, and to not route the request packet to the first at least one memory channel if the channel identifier stored in the control packet does not belong to the first set of channel identifiers;

wherein the second expansion buffer is coupled to the second at least one memory channel to route the request packet to a second memory channel belonging to the second at least one memory channel if the second memory channel's corresponding channel identifier matches the channel identifier stored in the control packet, and to not route the request packet to the second at least one memory channel if the channel identifier stored in the control packet does not belong to the second set of channel identifiers.

2. The memory system as set forth in claim 1, further comprising at least one memory device coupled to the first at least one memory channel, wherein, provided a framing field of the request packet indicates a non-broadcast operation, only those memory devices having device identification sequences matching a device address stored in the request packet perform an operation indicated by an opcode field of the request packet.

3. The memory system as set forth in claim 1, further comprising a set of memory devices, each memory device comprising at least one bank, each bank comprising an array of dynamic random access memory cells, wherein if there is more than one bank in the at least one bank, then each bank is assigned a bank address addressable by the request packet.

4. A memory system to provide packets to a set of memory devices, the memory system comprising:

an expansion bus to propagate a row control packet and a row request packet;

at least one memory channel, each of the at least one memory channel in one-to-one correspondence with a set of channel identifiers; and an expansion buffer to route the row request packet to a memory channel belonging to the at least one memory channel if the memory channel's corresponding channel identifier matches a channel identifier stored in the row control packet, and to not route the row request packet to the at least one memory channel if the channel identifier stored in the row control packet does not belong to the set of channel identifiers;

wherein, provided a generate field of the row control packet indicates that a secondary packet is to be generated, the expansion buffer is to generate a secondary packet on the channel specified by the channel identifier stored in the row control packet, where the secondary packet indicates an operation indicated by a secondary opcode field of the row control packet.

5. The memory system as set forth in claim 4, further comprising at least one memory device, wherein, provided a framing field of the row request packet indicates a non-broadcast operation, only those memory devices having device identification sequences matching a device address stored in the row request packet perform an operation indicated by an opcode field of the row request packet.

6. The memory system as set forth in claim 4, further comprising a set of memory devices, each memory device comprising at least one bank, each bank comprising an array of dynamic random access memory cells, wherein if there is more than one bank in the at least one bank, then each bank is assigned a bank address addressable by the row request packet.

7. The memory system as set forth in claim 5, wherein, provided a generate field of the row control packet indicates that a secondary packet is to be generated, the expansion buffer is to generate a secondary packet on the channel specified by the channel identifier stored in the row control packet, where the secondary packet indicates an operation indicated by a secondary opcode field of the row control packet.

8. The memory system as set forth in claim 7, further comprising a set of memory devices, wherein each memory device comprises at least one bank, each bank comprising an array of dynamic random access memory cells, wherein if there is more than one bank in the at least one bank, then each bank is assigned a bank address addressable by the row request packet.

9. The memory system as set forth in claim 4, wherein the expansion bus is to propagate a column control packet and a column request packet, wherein the expansion buffer is to route the column request packet to a channel based upon a channel identifier stored in the column control packet.

10. The memory system as set forth in claim 6, wherein the expansion bus is to propagate a column control packet and a column request packet, wherein the expansion buffer is to route the column request packet to a channel based upon a channel identifier stored in the column control packet.

11. The memory system as set forth in claim 4, wherein the expansion bus is to propagate a column control packet and a column request packet, wherein the expansion buffer is to provide a primary operation on a first channel based upon a primary operation code stored in the column request packet and a primary channel identifier stored in the column control packet, to route the column request packet to the first channel based upon the primary channel identifier, and to provide a secondary operation on a second channel based upon a secondary operation code and a secondary channel identifier stored in the column control packet.

12. The memory system as set forth in claim 4, wherein the expansion bus is to propagate a column control packet and a column request packet, wherein the expansion buffer, provided a redirect field of the column control packet indicates that a redirected column request packet is to be generated, redirects part of the column request packet to a channel based upon a secondary channel identifier stored in the column control packet.

13. The memory system as set forth in claim 6, wherein the expansion bus is to propagate a column control packet and a column request packet, wherein the expansion buffer is to provide a primary operation on a first channel based upon a primary operation code stored in the column request packet and a primary channel identifier stored in the column control packet, to route the column request packet to the first channel based upon the primary channel identifier, and to provide a secondary operation on a second channel based upon a secondary operation code and a secondary channel identifier stored in the column control packet.

14. The memory system as set forth in claim 6, wherein the expansion bus is to propagate a column control packet and a column request packet, wherein the expansion buffer, provided a redirect field of the column control packet indicates that a redirected column request packet is to be generated, redirects part of the column request packet to a channel based upon a secondary channel identifier stored in the column control packet.

15. A method for providing packets to a set of memory devices, where the set of memory devices is partitioned into at least one subset of memory devices so that each subset is coupled in one-to-one correspondence to each channel in a set of channels for sending and receiving packets, where the set of channels is coupled to an expansion buffer, wherein each channel has a corresponding expansion buffer channel identifier, wherein the expansion buffer has a corresponding expansion buffer identifier, the method comprising:

providing a control packet on an expansion bus, the control packet comprising a channel identification field to store an expansion buffer identifier and an expansion buffer channel identifier;

providing a request packet on the expansion bus, the request packet comprising an opcode field to store an operation code indicating an operation;

routing the request packet to the expansion buffer consistent with the expansion buffer identifier stored in the control packet; and routing the request packet to a channel coupled to the expansion buffer consistent with the expansion buffer channel identifier.

16. The method as set forth in claim 17, wherein each memory device has a register to store a device identification sequence; wherein the request packet further comprises:

a device address field to store a device address; and a framing field.

17. The method as set forth in claim 16, wherein the framing field is to indicate whether the operation indicated by the opcode field of the request packet is to be performed by all memory devices coupled to the channel to which the request packet is routed;

wherein, provided the framing field of the request packet indicates a non-broadcast operation, only those memory devices whose device identification sequences match the device address stored in the request packet perform the operation indicated by the opcode field of the request packet.

18. The method as set forth in claim 15, wherein each memory device comprises at least one bank, each bank comprising an array of dynamic random access memory cells, wherein if there is more than one bank in the at least one bank, then each bank is assigned a bank address; and the request packet further comprises a bank address field to store a bank address associated with a bank.

19. The method as set forth in claim 16, wherein each memory device comprises at least one bank, each bank comprising an array of dynamic random access memory cells, wherein if there is more than one bank in the at least one bank, then each bank is assigned a bank address; and the request packet further comprises a bank address field to store a bank address associated with a bank.

20. A method for providing packets to a set of memory devices, where the set of memory devices is partitioned into at least one subset of memory devices so that each subset is coupled to a channel for sending and receiving packets, wherein each channel has a unique channel identifier, the method comprising:

providing a row control packet on an expansion bus, the row control packet comprising a channel identification field to store a channel identifier, a generate field to indicate whether a secondary packet is generated, a secondary opcode field to store an operation code to indicate an operation, and a secondary channel identification field to store a channel identifier;

providing a row request packet on the expansion bus, the row request packet comprising an opcode field to store an operation code indicating an operation; and routing the row request packet to a channel based upon the channel identifier stored in the row control packet; and provided the generate field of the row control packet indicates that a secondary packet is to be generated, generating a secondary packet on a channel specified by the channel identifier stored in the secondary channel identification field, where the secondary packet indicates the operation indicated by the secondary opcode field of the row control packet.

21. The method as set forth in claim 20, wherein the row control packet and the row request packet are provided on the expansion bus substantially simultaneously.

22. The method as set forth in claim 20, wherein each memory device has a register to store a device identification sequence, wherein the row request packet comprises:

a device address field to store a device address; and a framing field.

23. The method as set forth in claim 22, wherein the framing field is to indicate whether the operation indicated by the opcode field of the row request packet is to be performed by all memory devices coupled to the channel to which the row request packet is routed, wherein provided the framing field of the row request packet indicates a non-broadcast operation, only those memory devices whose device identification sequences match the device address stored in the row request packet perform the operation indicated by the opcode field of the row request packet.

24. The method as set forth in claim 22, wherein each memory device comprises at least one bank, each bank comprising an array of dynamic random access memory cells, wherein if there is more than one bank in the at least one bank, then each bank is assigned a bank address; and the row request packet further comprises a bank address field to store a bank address associated with a bank.

25. The method as set forth in claim 20, wherein the row control packet further comprises a framing field.

26. The method as set forth in claim 22, wherein the row control packet further comprises:

a generate field to indicate whether a secondary packet is generated;

a secondary opcode field to store an operation code to indicate an operation; and a secondary channel identification field to store a channel identifier;

the method further comprising, provided the generate field of the row control packet indicates that a secondary packet is to be generated, generating a secondary packet on a channel specified by the channel identifier stored in the secondary channel identification field, where the secondary packet indicates the operation indicated by the secondary opcode field of the row control packet.

27. The method as set forth in claim 26, wherein the row control packet further comprises a framing field.

28. The method as set forth in claim 26, wherein each memory device comprises at least one bank, each bank comprising an array of dynamic random access memory cells, wherein if there is more than one bank in the at least one bank, then each bank is assigned a bank address; and the row request packet further comprises a bank address field to store a bank address associated with a bank.

29. The method as set forth in claim 20, further comprising:

providing a column control packet on the expansion bus, the column control packet comprising a channel identification field to store at least a portion of a channel identifier;

providing a column request packet on the expansion bus; and routing the column request packet to a channel consistent with the at least a portion of the channel identifier stored in the column control packet.

30. The method as set forth in claim 29, wherein the column control packet and the column request packet are provided on the expansion bus substantially simultaneously.

31. The method as set forth in claim 24, further comprising:

providing a column control packet on the expansion bus, the column control packet comprising a channel identification field to store at least a portion of a channel identifier;

providing a column request packet on the expansion bus; and routing the column request packet to a channel consistent with the at least a portion of the channel identifier stored in the column control packet.

32. The method as set forth in claim 20, further comprising:

providing a column control packet on the expansion bus, the column control packet comprising a primary channel identification field to store at least a portion of a primary channel identifier;

providing a column request packet on the expansion bus; and routing the column request packet to a channel consistent with the at least a portion of the primary channel identifier.

33. The method as set forth in claim 32, the column control packet further comprising:

a secondary opcode field to store a secondary operation code to indicate a secondary operation; and a secondary channel identification field to store a secondary channel identifier; the method further comprising:

performing the secondary operation on a channel indicative of the secondary channel identifier.

34. The method as set forth in claim 20, further comprising:

providing a column control packet on the expansion bus, the column control packet comprising a primary channel identification field to store at least a portion of a primary channel identifier; a redirect field to indicate whether a redirected column request packet is to be generated; and a secondary channel identification field to store a secondary channel identifier;

providing a column request packet on the expansion bus, the column request packet comprising an XOP/Byte Mask field indicating an XOP or Byte Mask operation; and provided the redirect field of the column control packet indicates that a redirected column request packet is to be generated, redirecting at least a portion of the column request packet to a channel based upon the secondary channel identifier stored in the column control packet to perform the XOP or Byte Mask operation.

35. The method as set forth in claim 24, further comprising:

providing a column control packet on the expansion bus, the column control packet comprising a primary channel identification field to store at least a portion of a primary channel identifier;

providing a column request packet on the expansion bus; and routing the column request packet to a channel consistent with the at least a portion of the primary channel identifier.

36. The method as set forth in claim 35, the column control packet further comprising:

a secondary opcode field to store a secondary operation code to indicate a secondary operation; and a secondary channel identification field to store a secondary channel identifier; the method further comprising:

performing the secondary operation on a channel indicative of the secondary channel identifier.

37. The method as set forth in claim 24, further comprising:

providing a column control packet on the expansion bus, the column control packet comprising a primary channel identification field to store at least a portion of a primary channel identifier; a redirect field to indicate whether a redirected column request packet is to be generated; and a secondary channel identification field to store a secondary channel identifier;

providing a column request packet on the expansion bus, the column request packet comprising an XOP/Byte Mask field indicating an XOP or Byte Mask operation; and provided the redirect field of the column control packet indicates that a redirected column request packet is to be generated, redirecting at least a portion of the column request packet to a channel based upon the secondary channel identifier stored in the column control packet to perform the XOP or Byte Mask operation.

* * * * *

UNITED STATES PATENT AND TRADEMARK OFFICE
CERTIFICATE OF CORRECTION

PATENT NO.    : 6,633,947 B1                                         Page 1 of 1
DATED         : October 14, 2003
INVENTOR(S)   : Holman et al.

It is certified that error appears in the above-identified patent and that said Letters Patent is hereby corrected as shown below:

<u>Column 7,</u>
Line 40, in table 4, after the word "accomplish", delete ",".

<u>Column 15,</u>
Line 60, delete "ExBuforan" and insert -- ExBuf or an --.

Signed and Sealed this

Third Day of February, 2004

JON W. DUDAS
*Acting Director of the United States Patent and Trademark Office*